US010693852B2

(12) United States Patent
Wood et al.

(10) Patent No.: US 10,693,852 B2
(45) **Date of Patent: *Jun. 23, 2020**

(54) SYSTEM FOR A SECURE ENCRYPTION PROXY IN A CONTENT CENTRIC NETWORK

(71) Applicant: Cisco Technology, Inc., San Jose, CA (US)

(72) Inventors: Christopher A. Wood, San Francisco, CA (US); Marc E. Mosko, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,897

(22) Filed: Aug. 1, 2018

(65) Prior Publication Data

US 2018/0337902 A1 Nov. 22, 2018

Related U.S. Application Data

(63) Continuation of application No. 15/154,825, filed on May 13, 2016, now Pat. No. 10,084,764.

(51) Int. Cl.
*H04L 9/32* (2006.01)
*H04L 29/06* (2006.01)
(Continued)

(52) U.S. Cl.
CPC ............ *H04L 63/061* (2013.01); *G06F 9/442* (2013.01); *G06F 11/327* (2013.01); (Continued)

(58) Field of Classification Search
CPC ..... H04L 63/061; H04L 63/062; G06F 9/442; G06F 11/327
See application file for complete search history.

(56) References Cited

U.S. PATENT DOCUMENTS 817,441 A 4/1906 Niesz
4,309,569 A 1/1982 Merkle
(Continued)

FOREIGN PATENT DOCUMENTS

DE 1720277 A1 6/1967
DE 19620817 A1 11/1997
(Continued)

OTHER PUBLICATIONS

International Search Report and Written Opinion in counterpart International Application No. PCT/US2017/031370, dated Jul. 26, 2017, 10 pages.

(Continued)

*Primary Examiner* — Paul E Callahan

(57) ABSTRACT

A router between a content consuming device and a content storage device obtains an interest corresponding to a content object. The interest includes a name identifying the content storage device, signaling information, an authentication token, and an inner interest identifying an actual content object stored at the content storage device. The inner interest is encrypted with an encryption key shared between the content storage device and the content consuming device, but not shared with the router. The router authenticates the interest by verifying the authentication token using an authentication key shared with the content consuming device. The router then provides the interest to the content storage device. The router obtains the content object, which includes at least a portion of the actual content object encrypted with the encryption key, from the content storage device. The router provides the content object to the content consuming device.

20 Claims, 16 Drawing Sheets

(51) Int. Cl.
*G06F 9/4401* (2018.01)
*G06F 11/32* (2006.01)

(52) U.S. Cl.
CPC ...... *H04L 63/0428* (2013.01); *H04L 63/0464* (2013.01); *H04L 63/062* (2013.01)

(56) References Cited

U.S. PATENT DOCUMENTS

| | | | |
|---|---|---|---|
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |
| 5,377,354 | A | 12/1994 | Scannell |
| 5,506,844 | A | 4/1996 | Rao |
| 5,629,370 | A | 5/1997 | Freidzon |
| 5,845,207 | A | 12/1998 | Amin |
| 5,870,605 | A | 2/1999 | Bracho |
| 6,052,683 | A | 4/2000 | Irwin |
| 6,085,320 | A | 7/2000 | Kaliski, Jr. |
| 6,091,724 | A | 7/2000 | Chandra |
| 6,128,623 | A | 10/2000 | Mattis |
| 6,128,627 | A | 10/2000 | Mattis |
| 6,173,364 | B1 | 1/2001 | Zenchelsky |
| 6,209,003 | B1 | 3/2001 | Mattis |
| 6,226,618 | B1 | 5/2001 | Downs |
| 6,233,617 | B1 | 5/2001 | Rothwein |
| 6,233,646 | B1 | 5/2001 | Hahm |
| 6,289,358 | B1 | 9/2001 | Mattis |
| 6,292,880 | B1 | 9/2001 | Mattis |
| 6,332,158 | B1 | 12/2001 | Risley |
| 6,366,988 | B1 | 4/2002 | Skiba |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,732,273 | B1 | 5/2004 | Byers |
| 6,769,066 | B1 | 7/2004 | Botros |
| 6,772,333 | B1 | 8/2004 | Brendel |
| 6,775,258 | B1 | 8/2004 | vanValkenburg |
| 6,862,280 | B1 | 3/2005 | Bertagna |
| 6,901,452 | B1 | 5/2005 | Bertagna |
| 6,915,307 | B1 | 7/2005 | Mattis |
| 6,917,985 | B2 | 7/2005 | Madruga |
| 6,957,228 | B1 | 10/2005 | Graser |
| 6,968,393 | B1 | 11/2005 | Chen |
| 6,981,029 | B1 | 12/2005 | Menditto |
| 7,007,024 | B2 | 2/2006 | Zelenka |
| 7,013,389 | B1 | 3/2006 | Srivastava |
| 7,031,308 | B2 | 4/2006 | Garcia-Luna-Aceves |
| 7,043,637 | B2 | 5/2006 | Bolosky |
| 7,061,877 | B1 | 6/2006 | Gummalla |
| 7,080,073 | B1 | 7/2006 | Jiang |
| RE39,360 | E | 10/2006 | Aziz |
| 7,149,750 | B2 | 12/2006 | Chadwick |
| 7,152,094 | B1 | 12/2006 | Jannu |
| 7,177,646 | B2 | 2/2007 | ONeill |
| 7,206,860 | B2 | 4/2007 | Murakami |
| 7,206,861 | B1 | 4/2007 | Callon |
| 7,210,326 | B2 | 5/2007 | Kawamoto |
| 7,246,159 | B2 | 7/2007 | Aggarwal |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,362,727 | B1 | 4/2008 | ONeill |
| 7,382,787 | B1 | 6/2008 | Barnes |
| 7,395,507 | B2 | 7/2008 | Robarts |
| 7,430,755 | B1 | 9/2008 | Hughes |
| 7,444,251 | B2 | 10/2008 | Nikovski |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,542,471 | B2 | 6/2009 | Samuels |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,564,812 | B1 | 7/2009 | Elliott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,636,767 | B2 | 12/2009 | Lev-Ran |
| 7,647,507 | B1 | 1/2010 | Feng |
| 7,660,324 | B2 | 2/2010 | Oguchi |
| 7,685,290 | B2 | 3/2010 | Satapati |
| 7,698,463 | B2 | 4/2010 | Ogier |
| 7,698,559 | B1 | 4/2010 | Chaudhury |
| 7,769,887 | B1 | 8/2010 | Bhattacharyya |
| 7,779,467 | B2 | 8/2010 | Choi |
| 7,801,069 | B2 | 9/2010 | Cheung |
| 7,801,177 | B2 | 9/2010 | Luss |
| 7,816,441 | B2 | 10/2010 | Elizalde |
| 7,831,733 | B2 | 11/2010 | Sultan |
| 7,873,619 | B1 | 1/2011 | Faibish |
| 7,953,885 | B1 | 1/2011 | Xue |
| 7,908,337 | B2 | 3/2011 | Garcia-Luna-Aceves |
| 7,924,837 | B1 | 4/2011 | Shabtay |
| 7,953,014 | B2 | 5/2011 | Toda |
| 8,000,267 | B2 | 8/2011 | Solis |
| 8,010,691 | B2 | 8/2011 | Kollmansberger |
| 8,069,023 | B1 | 11/2011 | Roka |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,271,578 | B2 | 9/2012 | Sheffi |
| 8,271,687 | B2 | 9/2012 | Turner |
| 8,312,064 | B1 | 11/2012 | Gauvin |
| 8,332,357 | B1 | 12/2012 | Chung |
| 8,386,622 | B2 | 2/2013 | Jacobson |
| 8,447,851 | B1 | 5/2013 | Anderson |
| 8,462,781 | B2 | 6/2013 | McGhee |
| 8,467,297 | B2 | 6/2013 | Liu |
| 8,473,633 | B2 | 6/2013 | Eardley |
| 8,553,562 | B2 | 10/2013 | Allan |
| 8,572,214 | B2 | 10/2013 | Garda-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,677,451 | B1 | 3/2014 | Bhimaraju |
| 8,688,619 | B1 | 4/2014 | Ezick |
| 8,699,350 | B1 | 4/2014 | Kumar |
| 8,718,055 | B2 | 5/2014 | Vasseur |
| 8,750,820 | B2 | 6/2014 | Allan |
| 8,761,022 | B2 | 6/2014 | Chlabaut |
| 8,762,477 | B2 | 6/2014 | Xie |
| 8,762,570 | B2 | 6/2014 | Qian |
| 8,762,707 | B2 | 6/2014 | Killian |
| 8,767,627 | B2 | 7/2014 | Enure |
| 8,817,594 | B2 | 8/2014 | Gero |
| 8,826,381 | B2 | 9/2014 | Kim |
| 8,832,302 | B1 | 9/2014 | Guichard |
| 8,836,536 | B2 | 9/2014 | Marwah |
| 8,861,356 | B2 | 10/2014 | Kozat |
| 8,862,774 | B2 | 10/2014 | Vasseur |
| 8,868,779 | B2 | 10/2014 | ONeill |
| 8,874,842 | B1 | 10/2014 | Kimmel |
| 8,880,682 | B2 | 11/2014 | Bishop |
| 8,903,756 | B2 | 12/2014 | Zhao |
| 8,923,293 | B2 | 12/2014 | Jacobson |
| 8,934,496 | B2 | 1/2015 | Vasseur |
| 8,937,865 | B1 | 1/2015 | Kumar |
| 8,972,969 | B2 | 3/2015 | Gaither |
| 8,977,596 | B2 | 3/2015 | Montulli |
| 9,002,921 | B2 | 4/2015 | Westphal |
| 9,071,498 | B2 | 6/2015 | Beser |

(56) References Cited

U.S. PATENT DOCUMENTS

| | | | | |
|---|---|---|---|---|
| 9,112,895 | B1 | 8/2015 | Lin | |
| 9,253,087 | B2 | 2/2016 | Zhang | |
| 9,280,610 | B2 | 3/2016 | Gruber | |
| 9,338,150 | B2 | 5/2016 | Franck | |
| 9,390,289 | B2 | 7/2016 | Mosko | |
| 10,084,764 | B2 * | 9/2018 | Wood | G06F 9/442 |
| 2002/0002680 | A1 | 1/2002 | Carbajal | |
| 2002/0010795 | A1 | 1/2002 | Brown | |
| 2002/0038296 | A1 | 3/2002 | Margolus | |
| 2002/0048269 | A1 | 4/2002 | Hong | |
| 2002/0054593 | A1 | 5/2002 | Morohashi | |
| 2002/0077988 | A1 | 6/2002 | Sasaki | |
| 2002/0078066 | A1 | 6/2002 | Robinson | |
| 2002/0138551 | A1 | 9/2002 | Erickson | |
| 2002/0152305 | A1 | 10/2002 | Jackson | |
| 2002/0176404 | A1 | 11/2002 | Girard | |
| 2002/0188605 | A1 | 12/2002 | Adya | |
| 2002/0199014 | A1 | 12/2002 | Yang | |
| 2003/0004621 | A1 | 1/2003 | Bousquet | |
| 2003/0009365 | A1 | 1/2003 | Tynan | |
| 2003/0033394 | A1 | 2/2003 | Stine | |
| 2003/0046396 | A1 | 3/2003 | Richter | |
| 2003/0046421 | A1 | 3/2003 | Horvitz et al. | |
| 2003/0046437 | A1 | 3/2003 | Eytchison | |
| 2003/0048793 | A1 | 3/2003 | Pochon | |
| 2003/0051100 | A1 | 3/2003 | Patel | |
| 2003/0061384 | A1 | 3/2003 | Nakatani | |
| 2003/0074472 | A1 | 4/2003 | Lucco | |
| 2003/0088696 | A1 | 5/2003 | McCanne | |
| 2003/0097447 | A1 | 5/2003 | Johnston | |
| 2003/0099237 | A1 | 5/2003 | Mitra | |
| 2003/0140257 | A1 | 7/2003 | Peterka | |
| 2003/0229892 | A1 | 12/2003 | Sardera | |
| 2004/0024879 | A1 | 2/2004 | Dingman | |
| 2004/0030602 | A1 | 2/2004 | Rosenquist | |
| 2004/0064737 | A1 | 4/2004 | Milliken | |
| 2004/0071140 | A1 | 4/2004 | Jason | |
| 2004/0073617 | A1 | 4/2004 | Milliken | |
| 2004/0073715 | A1 | 4/2004 | Folkes | |
| 2004/0139230 | A1 | 7/2004 | Kim | |
| 2004/0196783 | A1 | 10/2004 | Shinomiya | |
| 2004/0221047 | A1 | 11/2004 | Grover | |
| 2004/0225627 | A1 | 11/2004 | Botros | |
| 2004/0233916 | A1 | 11/2004 | Takeuchi | |
| 2004/0246902 | A1 | 12/2004 | Weinstein | |
| 2004/0252683 | A1 | 12/2004 | Kennedy | |
| 2005/0003832 | A1 | 1/2005 | Osafune | |
| 2005/0028156 | A1 | 2/2005 | Hammond | |
| 2005/0043060 | A1 | 2/2005 | Brandenberg | |
| 2005/0050211 | A1 | 3/2005 | Kaul | |
| 2005/0074001 | A1 | 4/2005 | Mattes | |
| 2005/0132207 | A1 | 6/2005 | Mourad | |
| 2005/0149508 | A1 | 7/2005 | Deshpande | |
| 2005/0159823 | A1 | 7/2005 | Hayes | |
| 2005/0198351 | A1 | 9/2005 | Nog | |
| 2005/0249196 | A1 | 11/2005 | Ansari | |
| 2005/0259637 | A1 | 11/2005 | Chu | |
| 2005/0262217 | A1 | 11/2005 | Nonaka | |
| 2005/0281288 | A1 | 12/2005 | Banerjee | |
| 2005/0286535 | A1 | 12/2005 | Shrum | |
| 2005/0289222 | A1 | 12/2005 | Sahim | |
| 2006/0010249 | A1 | 1/2006 | Sabesan | |
| 2006/0029102 | A1 | 2/2006 | Abe | |
| 2006/0039379 | A1 | 2/2006 | Abe | |
| 2006/0051055 | A1 | 3/2006 | Ohkawa | |
| 2006/0072523 | A1 | 4/2006 | Richardson | |
| 2006/0099973 | A1 | 5/2006 | Nair | |
| 2006/0129514 | A1 | 6/2006 | Watanabe | |
| 2006/0133343 | A1 | 6/2006 | Huang | |
| 2006/0146686 | A1 | 7/2006 | Kim | |
| 2006/0173831 | A1 | 8/2006 | Basso | |
| 2006/0193295 | A1 | 8/2006 | White | |
| 2006/0203804 | A1 | 9/2006 | Whitmore | |
| 2006/0206445 | A1 | 9/2006 | Andreoli | |
| 2006/0215684 | A1 | 9/2006 | Capone | |
| 2006/0223504 | A1 | 10/2006 | Ishak | |
| 2006/0256767 | A1 | 11/2006 | Suzuki | |
| 2006/0262783 | A1 | 11/2006 | Nedeltchev | |
| 2006/0268792 | A1 | 11/2006 | Belcea | |
| 2007/0019619 | A1 | 1/2007 | Foster | |
| 2007/0073888 | A1 | 3/2007 | Madhok | |
| 2007/0094265 | A1 | 4/2007 | Korkus | |
| 2007/0112880 | A1 | 5/2007 | Yang | |
| 2007/0124412 | A1 | 5/2007 | Narayanaswarni | |
| 2007/0127457 | A1 | 6/2007 | Mirtorabi | |
| 2007/0160062 | A1 | 7/2007 | Morishita | |
| 2007/0162394 | A1 | 7/2007 | Zager | |
| 2007/0171828 | A1 | 7/2007 | Dalal | |
| 2007/0189284 | A1 | 8/2007 | Kecskemeti | |
| 2007/0195765 | A1 | 8/2007 | Heissenbuttel | |
| 2007/0204011 | A1 | 8/2007 | Shaver | |
| 2007/0209067 | A1 | 9/2007 | Fogel | |
| 2007/0239892 | A1 | 10/2007 | Ott | |
| 2007/0240207 | A1 | 10/2007 | Belakhdar | |
| 2007/0245034 | A1 | 10/2007 | Retana | |
| 2007/0253418 | A1 | 11/2007 | Shiri | |
| 2007/0255677 | A1 | 11/2007 | Alexander | |
| 2007/0255699 | A1 | 11/2007 | Sreenivas | |
| 2007/0255781 | A1 | 11/2007 | Li | |
| 2007/0274504 | A1 | 11/2007 | Maes | |
| 2007/0275701 | A1 | 11/2007 | Jonker | |
| 2007/0276907 | A1 | 11/2007 | Maes | |
| 2007/0233158 | A1 | 12/2007 | Danseglio | |
| 2007/0294187 | A1 | 12/2007 | Scherrer | |
| 2008/0005056 | A1 | 1/2008 | Stelzig | |
| 2008/0010366 | A1 | 1/2008 | Duggan | |
| 2008/0037420 | A1 | 2/2008 | Tang | |
| 2008/0043989 | A1 | 2/2008 | Furutono | |
| 2008/0046340 | A1 | 2/2008 | Brown | |
| 2008/0059631 | A1 | 3/2008 | Bergstrom | |
| 2008/0080440 | A1 | 4/2008 | Yarvis | |
| 2008/0101357 | A1 | 5/2008 | Iovanna | |
| 2008/0107034 | A1 | 5/2008 | Jetcheva | |
| 2008/0107259 | A1 | 5/2008 | Satou | |
| 2008/0123862 | A1 | 5/2008 | Rowley | |
| 2008/0133583 | A1 | 6/2008 | Artan | |
| 2008/0133755 | A1 | 6/2008 | Pollack | |
| 2008/0151755 | A1 | 6/2008 | Nishioka | |
| 2008/0159271 | A1 | 7/2008 | Kutt | |
| 2008/0165775 | A1 | 7/2008 | Das | |
| 2008/0186901 | A1 | 8/2008 | Itagaki | |
| 2008/0200153 | A1 | 8/2008 | Fitzpatrick | |
| 2008/0215669 | A1 | 9/2008 | Gaddy | |
| 2008/0216086 | A1 | 9/2008 | Tanaka | |
| 2008/0243992 | A1 | 10/2008 | Jardetzky | |
| 2008/0250006 | A1 | 10/2008 | Dettinger | |
| 2008/0256138 | A1 | 10/2008 | Sim-Tang | |
| 2008/0256359 | A1 | 10/2008 | Kahn | |
| 2008/0270618 | A1 | 10/2008 | Rosenberg | |
| 2008/0271143 | A1 | 10/2008 | Stephens | |
| 2008/0287142 | A1 | 11/2008 | Keighran | |
| 2008/0288580 | A1 | 11/2008 | Wang | |
| 2008/0298376 | A1 | 12/2008 | Takeda | |
| 2008/0320148 | A1 | 12/2008 | Capuozzo | |
| 2009/0006659 | A1 | 1/2009 | Collins | |
| 2009/0013324 | A1 | 1/2009 | Gobara | |
| 2009/0022154 | A1 | 1/2009 | Kiribe | |
| 2009/0024641 | A1 | 1/2009 | Quigley | |
| 2009/0030978 | A1 | 1/2009 | Johnson | |
| 2009/0037763 | A1 | 2/2009 | Adhya | |
| 2009/0052660 | A1 | 2/2009 | Chen | |
| 2009/0067429 | A1 | 3/2009 | Nagai | |
| 2009/0077184 | A1 | 3/2009 | Brewer | |
| 2009/0092043 | A1 | 4/2009 | Lapuh | |
| 2009/0097631 | A1 | 4/2009 | Gisby | |
| 2009/0103515 | A1 | 4/2009 | Pointer | |
| 2009/0113068 | A1 | 4/2009 | Fujihira | |
| 2009/0116393 | A1 | 5/2009 | Hughes | |
| 2009/0117922 | A1 | 5/2009 | Bell | |
| 2009/0132662 | A1 | 5/2009 | Sheridan | |
| 2009/0135728 | A1 | 5/2009 | Shen | |
| 2009/0144300 | A1 | 6/2009 | Chatley | |
| 2009/0157887 | A1 | 6/2009 | Froment | |
| 2009/0185745 | A1 | 7/2009 | Momosaki | |

(56) References Cited

U.S. PATENT DOCUMENTS

2009/0193101 A1 7/2009 Munetsugu
2009/0198832 A1 8/2009 Shah et al.
2009/0222344 A1 9/2009 Greene
2009/0228593 A1 9/2009 Takeda
2009/0254572 A1 10/2009 Redlich
2009/0268905 A1 10/2009 Matsushima
2009/0274158 A1 11/2009 Sharp
2009/0276396 A1 11/2009 Gorman
2009/0285209 A1 11/2009 Stewart
2009/0287835 A1 11/2009 Jacobson
2009/0287853 A1 11/2009 Carson
2009/0288076 A1 11/2009 Johnson
2009/0288143 A1 11/2009 Stebila
2009/0288163 A1 11/2009 Jacobson
2009/0292743 A1 11/2009 Bigus
2009/0293121 A1 11/2009 Bigus
2009/0300079 A1 12/2009 Shitomi
2009/0300407 A1 12/2009 Kamath
2009/0300512 A1 12/2009 Ahn
2009/0307333 A1 12/2009 Welingkar
2009/0323632 A1 12/2009 Nix
2010/0005061 A1 1/2010 Basco
2010/0027539 A1 2/2010 Beverly
2010/0046546 A1 2/2010 Ram
2010/0057929 A1 3/2010 Merat
2010/0058346 A1 3/2010 Narang
2010/0088370 A1 4/2010 Wu
2010/0094767 A1 4/2010 Miltonberger
2010/0094876 A1 4/2010 Huang
2010/0098093 A1 4/2010 Ejzak
2010/0100465 A1 4/2010 Cooke
2010/0103870 A1 4/2010 Garcia-Luna-Aceves
2010/0124191 A1 5/2010 Vos
2010/0125911 A1 5/2010 Bhaskaran
2010/0131660 A1 5/2010 Dec
2010/0150155 A1 6/2010 Napierala
2010/0165976 A1 7/2010 Khan
2010/0169478 A1 7/2010 Saha
2010/0169503 A1 7/2010 Kollmansberger
2010/0180332 A1 7/2010 Ben-Yochanan
2010/0182995 A1 7/2010 Hwang
2010/0185753 A1 7/2010 Liu
2010/0195653 A1 8/2010 Jacobson
2010/0195654 A1 8/2010 Jacobson
2010/0195655 A1 8/2010 Jacobson
2010/0217874 A1 8/2010 Anantharaman
2010/0217985 A1 8/2010 Fahrny
2010/0232402 A1 9/2010 Przybysz
2010/0232439 A1 9/2010 Dham
2010/0235516 A1 9/2010 Nakamura
2010/0246549 A1 9/2010 Zhang
2010/0250497 A1 9/2010 Redlich
2010/0250939 A1 9/2010 Adams
2010/0257149 A1 10/2010 Cognigni
2010/0268782 A1 10/2010 Zombek
2010/0272107 A1 10/2010 Papp
2010/0281263 A1 11/2010 Ugawa
2010/0284309 A1 11/2010 Allan
2010/0284404 A1 11/2010 Gopinath
2010/0293293 A1 11/2010 Beser
2010/0322249 A1 12/2010 Thathapudi
2011/0019674 A1 1/2011 Iovanna
2011/0022812 A1 1/2011 vanderLinden
2011/0029952 A1 2/2011 Harrington
2011/0055392 A1 3/2011 Shen
2011/0055921 A1 3/2011 Narayanaswamy
2011/0060716 A1 3/2011 Forman
2011/0060717 A1 3/2011 Forman
2011/0090908 A1 4/2011 Jacobson
2011/0106755 A1 5/2011 Hao
2011/0137919 A1 6/2011 Ryu
2011/0145597 A1 6/2011 Yamaguchi
2011/0145858 A1 6/2011 Philpott
2011/0149858 A1 6/2011 Hwang
2011/0153840 A1 6/2011 Narayana
2011/0158122 A1 6/2011 Murphy
2011/0161408 A1 6/2011 Kim
2011/0202609 A1 8/2011 Chaturvedi
2011/0219093 A1 9/2011 Ragunathan
2011/0219427 A1 9/2011 Hito
2011/0219727 A1 9/2011 May
2011/0225293 A1 9/2011 Rathod
2011/0231578 A1 9/2011 Nagappan
2011/0239256 A1 9/2011 Gholmieh
2011/0258049 A1 10/2011 Ramer
2011/0264824 A1 10/2011 Venkata Subramanian
2011/0265159 A1 10/2011 Ronda
2011/0265174 A1 10/2011 Thornton
2011/0271007 A1 11/2011 Wang
2011/0286457 A1 11/2011 Ee
2011/0286459 A1 11/2011 Rembarz
2011/0295783 A1 12/2011 Zhao
2011/0299454 A1 12/2011 Krishnaswamy
2012/0011170 A1 1/2012 Elad
2012/0011551 A1 1/2012 Levy
2012/0023113 A1 1/2012 Ferren
2012/0036180 A1 2/2012 Thornton
2012/0047361 A1 2/2012 Erdmann
2012/0066727 A1 3/2012 Nozoe
2012/0106339 A1 5/2012 Mishra
2012/0114313 A1 5/2012 Phillips
2012/0120803 A1 5/2012 Farkas
2012/0127994 A1 5/2012 Ko
2012/0136676 A1 5/2012 Goodall
2012/0136936 A1 5/2012 Quintuna
2012/0136945 A1 5/2012 Lee
2012/0137367 A1 5/2012 Dupont
2012/0141093 A1 6/2012 Yamaguchi
2012/0155464 A1 6/2012 Kim
2012/0158973 A1 6/2012 Jacobson
2012/0163373 A1 6/2012 Lo
2012/0166433 A1 6/2012 Tseng
2012/0170913 A1 7/2012 Isozaki
2012/0179653 A1 7/2012 Araki
2012/0197690 A1 8/2012 Agulnek
2012/0198048 A1 8/2012 Ioffe
2012/0221150 A1 8/2012 Arensmeier
2012/0224487 A1 9/2012 Hui
2012/0226902 A1 9/2012 Kim
2012/0257500 A1 10/2012 Lynch
2012/0284791 A1 11/2012 Miller
2012/0290669 A1 11/2012 Parks
2012/0290919 A1 11/2012 Melnyk
2012/0291102 A1 11/2012 Cohen
2012/0307629 A1 12/2012 Vasseur
2012/0314580 A1 12/2012 Hong
2012/0317307 A1 12/2012 Ravindran
2012/0322422 A1 12/2012 Frecks
2012/0323933 A1 12/2012 He
2012/0331112 A1 12/2012 Chatani
2013/0024560 A1 1/2013 Vasseur
2013/0041982 A1 2/2013 Shi
2013/0051392 A1 2/2013 Filsfils
2013/0054971 A1 2/2013 Yamaguchi
2013/0060962 A1 3/2013 Wang
2013/0061084 A1 3/2013 Barton
2013/0066823 A1 3/2013 Sweeney
2013/0073552 A1 3/2013 Rangwala
2013/0074155 A1 3/2013 Huh
2013/0090942 A1 4/2013 Robinson
2013/0091539 A1 4/2013 Khurana
2013/0110987 A1 5/2013 Kim
2013/0111063 A1 5/2013 Lee
2013/0132719 A1 5/2013 Kobayashi
2013/0151584 A1 6/2013 Westphal
2013/0151646 A1 6/2013 Chidambaram
2013/0152070 A1 6/2013 Bhullar
2013/0163426 A1 6/2013 Beliveau
2013/0166668 A1 6/2013 Byun
2013/0173822 A1 7/2013 Hong
2013/0182568 A1 7/2013 Lee
2013/0182931 A1 7/2013 Fan
2013/0185406 A1 7/2013 Choi
2013/0191412 A1 7/2013 Kitamura

(56) References Cited

U.S. PATENT DOCUMENTS

| | | | |
|---|---|---|---|
| 2013/0197698 | A1 | 8/2013 | Shah |
| 2013/0198119 | A1 | 8/2013 | Eberhardt, III |
| 2013/0212185 | A1 | 8/2013 | Pasquero |
| 2013/0219038 | A1 | 8/2013 | Lee |
| 2013/0219081 | A1 | 8/2013 | Qian |
| 2013/0219478 | A1 | 8/2013 | Mahamuni |
| 2013/0223237 | A1 | 8/2013 | Hui |
| 2013/0227114 | A1 | 8/2013 | Vasseur |
| 2013/0227166 | A1 | 8/2013 | Ravindran |
| 2013/0242996 | A1 | 9/2013 | Varvello |
| 2013/0250809 | A1 | 9/2013 | Hui |
| 2013/0262365 | A1 | 10/2013 | Dolbear |
| 2013/0262587 | A1 | 10/2013 | Munger et al. |
| 2013/0282854 | A1 | 10/2013 | Jang |
| 2013/0282860 | A1 | 10/2013 | Zhang |
| 2013/0282920 | A1 | 10/2013 | Zhang |
| 2013/0304758 | A1 | 11/2013 | Gruber |
| 2013/0304937 | A1 | 11/2013 | Lee |
| 2013/0325888 | A1 | 12/2013 | Oneppo |
| 2013/0329696 | A1 | 12/2013 | Xu |
| 2013/0336103 | A1 | 12/2013 | Vasseur |
| 2013/0336323 | A1 | 12/2013 | Srinivasan |
| 2013/0339481 | A1 | 12/2013 | Hong |
| 2013/0343408 | A1 | 12/2013 | Cook |
| 2014/0003424 | A1 | 1/2014 | Matsuhira |
| 2014/0006354 | A1 | 1/2014 | Parkison |
| 2014/0006565 | A1 | 1/2014 | Muscariello |
| 2014/0029445 | A1 | 1/2014 | Hui |
| 2014/0032714 | A1 | 1/2014 | Liu |
| 2014/0033193 | A1 | 1/2014 | Palaniappan |
| 2014/0040505 | A1 | 2/2014 | Barton |
| 2014/0040628 | A1 | 2/2014 | Fort |
| 2014/0047513 | A1 | 2/2014 | vantNoordende |
| 2014/0074730 | A1 | 3/2014 | Arensmeier |
| 2014/0075567 | A1 | 3/2014 | Raleigh |
| 2014/0082135 | A1 | 3/2014 | Jung |
| 2014/0082661 | A1 | 3/2014 | Krahnstoever |
| 2014/0089454 | A1 | 3/2014 | Jeon |
| 2014/0096249 | A1 | 4/2014 | Dupont |
| 2014/0108313 | A1 | 4/2014 | Heidasch |
| 2014/0108474 | A1 | 4/2014 | David |
| 2014/0115037 | A1 | 4/2014 | Liu |
| 2014/0122587 | A1 | 5/2014 | Petker et al. |
| 2014/0129736 | A1 | 5/2014 | Yu |
| 2014/0136814 | A1 | 5/2014 | Stark |
| 2014/0140348 | A1 | 5/2014 | Perlman |
| 2014/0143370 | A1 | 5/2014 | Vilenski |
| 2014/0146819 | A1 | 5/2014 | Bae |
| 2014/0149733 | A1 | 5/2014 | Kim |
| 2014/0156396 | A1 | 6/2014 | deKozan |
| 2014/0165207 | A1 | 6/2014 | Engel |
| 2014/0172783 | A1 | 6/2014 | Suzuki |
| 2014/0172981 | A1 | 6/2014 | Kim |
| 2014/0173034 | A1 | 6/2014 | Liu |
| 2014/0173076 | A1 | 6/2014 | Ravindran |
| 2014/0192717 | A1 | 7/2014 | Liu |
| 2014/0195328 | A1 | 7/2014 | Ferens |
| 2014/0195641 | A1 | 7/2014 | Wang |
| 2014/0195666 | A1 | 7/2014 | Dumitriu |
| 2014/0214942 | A1 | 7/2014 | Ozonat |
| 2014/0233575 | A1 | 8/2014 | Xie |
| 2014/0237085 | A1 | 8/2014 | Park |
| 2014/0237095 | A1 | 8/2014 | Bevilacqua-Linn |
| 2014/0245359 | A1 | 8/2014 | DeFoy |
| 2014/0254595 | A1 | 9/2014 | Luo |
| 2014/0280823 | A1 | 9/2014 | Varvello |
| 2014/0281489 | A1 | 9/2014 | Peterka |
| 2014/0281505 | A1 | 9/2014 | Zhang |
| 2014/0282816 | A1 | 9/2014 | Xie |
| 2014/0289325 | A1 | 9/2014 | Solis |
| 2014/0289790 | A1 | 9/2014 | Wilson |
| 2014/0298248 | A1 | 10/2014 | Kang |
| 2014/0314093 | A1 | 10/2014 | You |
| 2014/0337276 | A1 | 11/2014 | Iordanov |
| 2014/0365550 | A1 | 12/2014 | Jang |
| 2015/0006896 | A1 | 1/2015 | Franck |
| 2015/0018770 | A1 | 1/2015 | Baran |
| 2015/0032892 | A1 | 1/2015 | Narayanan |
| 2015/0033365 | A1 | 1/2015 | Mellor |
| 2015/0039890 | A1 | 2/2015 | Khosravi |
| 2015/0063802 | A1 | 3/2015 | Bahadur |
| 2015/0089081 | A1 | 3/2015 | Thubert |
| 2015/0095481 | A1 | 4/2015 | Ohnishi |
| 2015/0095514 | A1 | 4/2015 | Yu |
| 2015/0120663 | A1 | 4/2015 | LeScouarnec |
| 2015/0139166 | A1 | 5/2015 | Yao et al. |
| 2015/0169758 | A1 | 6/2015 | Assom |
| 2015/0188770 | A1 | 7/2015 | Naiksatam |
| 2015/0195149 | A1 | 7/2015 | Vasseur |
| 2015/0207633 | A1 | 7/2015 | Ravindran |
| 2015/0207864 | A1 | 7/2015 | Wilson |
| 2015/0279348 | A1 | 10/2015 | Cao |
| 2015/0349961 | A1 | 12/2015 | Mosko |
| 2015/0372903 | A1 | 12/2015 | Hui |
| 2015/0381546 | A1 | 12/2015 | Mahadevan |
| 2016/0021172 | A1 | 1/2016 | Mahadevan |
| 2017/0331800 | A1 | 11/2017 | Wood et al. |

FOREIGN PATENT DOCUMENTS

| | | | |
|---|---|---|---|
| EP | 0295727 | A2 | 12/1988 |
| EP | 0757065 | A2 | 7/1996 |
| EP | 1077422 | A2 | 2/2001 |
| EP | 1384729 | A1 | 1/2004 |
| EP | 2120419 | | 11/2009 |
| EP | 2124415 | A2 | 11/2009 |
| EP | 20120402 | | 11/2009 |
| EP | 2214357 | A1 | 8/2010 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2007113180 | A1 | 10/2007 |
| WO | 2007144388 | A1 | 12/2007 |
| WO | 2011049890 | A1 | 4/2011 |
| WO | 2013123410 | | 8/2013 |

OTHER PUBLICATIONS

Ghali, et al., "Interest-Based Access Control for Content Centric Networks," Proceedings of the 2nd ACM Conference on Information-Centric Networking, Oct. 2005, 11 pages.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van at al. VoCCN: Voice Over Content-Centric Natworks. Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-46.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

(56) References Cited

OTHER PUBLICATIONS

"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking, ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31. Dec. 1993.
Afanasyev, Alexander, et al. "Interest flooding attack and countermeasures in Named Data Networking." IFIP Networking Cenference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Translations on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine. IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Crytology—ASIACRYPT 2002. Springer Berlin Heidelberg (2002).
C.A. Wood and E. Uzun, "Flexible end-to-end content security in CCN," in Proc. IEEE CCNC 2014. Las Vegas CA, USA; Jan. 2014.
Carzaniga, Antonio, Matthew J. Rutherford, and Alexander L. Wolf. 'A routing scheme for content-based networking' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Well Pairing, Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.

Dabirmoghaddam. Ali, Maziar Mizazad Barijough. and J. J. Garcia-Luna-Aceves. 'Understanding Optimal caching and opportunistic caching all the edge of information-centric networks.' Proceecings of the 1st internalional conference on Information-centric networking. ACM, 2014.
Detti et al., "Supporting the Web with an information centric network that routes by name", Aug. 2012, Computer Networks 56. pp. 3705-3702.
Dijkstra, Edsger W., and Carel S. Scholten. 'Termination detection for diffusing computations.' Information Processing Letters 11.1 (1980): 1-4.
Dijkstra. Edsger W., Wim HJ Feijen, and A J M. Van Gasteren. "Derivation of a termination detection algorithm for distributed computations." Control Flow and Data Flow: concepts of distributed programming Springer Berlin Heidelberg. 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tooloonchian. A., Ghodsi. A., Koponen, T., Maggs, B., & Shenker, S. {Aug. 2013). Less pain, most of the gain: Incrementally deployable ICN, In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services." in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-tree routing using distance vectors or ink states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings oF NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gugta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herllch, Matthias et al., "Optimizing Energy Efficiency for Bulk transfer Networks". Apr. 13, 2010, pp. 1-3, retrieved for the Internet: URL:http://www.cs.uni-paderborn.de/fileadmin/informationik/ag-karl/publication/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.

(56) References Cited

OTHER PUBLICATIONS

I. Psaras, R.G. Clegg, R. Landa, W.K. Chai, and G. Pavlou, "Modelling and Evaluation of CCN-caching trees," in Proc. IFIP Networking 2011, Valencia, Spain, May 2011, pp. 78-91.
Intanagonwiwat, Chatermek, Ramesh Govinden, and Deborah Estrin, 'Directed diffusion: a scalable and robust communication paradigm for sensor networks.' Proceedings of the 6th annual international conference on Mobile computing and networking, ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA—Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based information Sharing," Jul. 2012, EEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, I. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M Hitchens, "Achieving secure role-based access control on encrypted data in cloud storage," IEEE Trans. Inf. Forensics Security, vol. 8, No. 12, pp. 1947-1960, Dec. 2013.
Li, Wenja, Anupam Joshi, and Tim Finin "Coping with node misbehaviors in ad hoc networks: A multi-dimensional trust management approach." Mobile Data Management (MDM), 2010 Eleventh International Conference on IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENEX NSDI 2004, Oct. 2010, pp, 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36, No. 4, ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E. Uzun, S. Sevilla, and J. Garcia-Luna-Aceves, "CCN-krs: A key resolutiion service for loci," in Proceedings of the 1st International Conference on Information-centric Networking, Ser. INC '14 New York, NY, USA: ACM, 2014, pp. 97-106 [Online]. Avaliable: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area muiticast routing" IEEE/ACM Trans, on Networking, vol. 4, No. 2, Apr. 1996.
S. Jahid, P. Mittal, and N. Borisov. "EASIER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementaiton, and analysis," in Proc. ACM SIGCOMM ICN 2013, Hong Kong, China, Aug. 2013, pp. 73-76.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study at a Hierarchical, Rule-Based Method for System-Level Fault Detection and Diagnostics in HVAC Systems. US Department of Commerce, [Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.

(56) References Cited

OTHER PUBLICATIONS

Sheppard, John W., and Stephyn GW Butcher. "A formal analysis of fault diagnosis wrth d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted envieronments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. DIERTS, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp 181-192, Oct. 2007.
The Despotify Project (2012). Available online at http://despotify.sourceforge.net/.
V. Goyal, O. Pandey, A. Sahai. and B. Waters, "Attribute-based encryption for fine-grained access control of encrypted data," in Proc. ACM CCS 2006. Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments Ed. Raja Chatila. Oct. 2002.
Vijay Kumar Adhikari, Yang Guo, Fang Hao, Matteo Varvello, Volker Hilt, Moritz Steiner, and Zhi-Li Zhang Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simpie approximation to minimum-delay routing. vol. 29. No. 4. ACM, 1999.
W.-G. Tzeng and Z.-J. Tzeng, "A public-key trailor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang; Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zaharladis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network base on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diflusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systems," IEEE Trans. Parallel Distrib. Syst. vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berling Heidelberg (2010).
RTMP (2009). Avaliable online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999, pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV Structured Data Naming Scheme for Content-Oriented Networking, pp. 5822-5827, International Workshop on the Network of the Future, Communications (ICC), 2012 IEEE International Conference on Jun. 10-15, 2012)
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Gamepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.

\* cited by examiner

ENTITIES 101

TABLE 160

| KEYS 161 | CONSUMER 102 | PROXY 106 | REPLICA 108 | PRODUCER 110 |
|---|---|---|---|---|
| PUBLIC/PRIVATE KEY (DC) 162 | Y | | | Y |
| ENCRYPTION KEY ($K_E$) 164 | $K_E$ | | $K_E$ | |
| AUTHENTICATION KEY ($K_A$) 166 | $K_A$ | $K_A$ | $K_A$ | |
| SIGNALING KEY ($K_S$) 168 | $K_S$ | $K_S$ | $K_S$ | |

SYSTEM FOR A SECURE ENCRYPTION PROXY IN A CONTENT CENTRIC NETWORK

CROSS-REFERENCE TO RELATED APPLICATIONS

This application is a continuation of U.S. patent application Ser. No. 15/154,825, filed May 13, 2016, now U.S. Pat. No. 10,084,764, the entirety of which is incorporated herein by reference.

BACKGROUND

Field

This disclosure is generally related to distribution of digital content. More specifically, this disclosure is related to a system for a secure encryption performance enhancing proxy in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

Digital content may be carried over wireless links based on a transport control protocol (TCP). However, because the digital content can travel over both a radio link and a wireline link, TCP may result in poor performance due to the different channel responses for a transport protocol for a radio link and for a wireline link. One solution is to split or proxy the topology by inserting a middle box (e.g., a performance enhancing proxy, or a PEP) which terminates the radio transport loop and establishes a second transport loop to the wireline system. This allows the transport protocols to optimize performance on each side of the proxy and keep the air interface full with a minimum of duplicate data due to TCP retransmission requests. However, today's network traffic uses an increased amount of encryption, which prevents middle boxes (such as PEPs), from intercepting encrypted sessions. As a result, the PEPs cannot proxy the encrypted traffic. The encrypted traffic loses the benefit of the proxy over the wireless link, and the PEPs are unable to do much more than packet shaping to adjust data rates.

While a CCN brings many desired features to a network, some issues remain unsolved for implementing a secure encryption proxy in a content centric network.

SUMMARY

One embodiment provides a system that facilitates a secure encryption proxy in a content centric network. During operation, the system receives, by an intermediate router from a content-consuming computing device, a first interest that includes a first name, signaling information encrypted based on a signaling key, and an inner interest encrypted based on an encryption key. The inner interest includes a name for a manifest that represents a collection of data. The intermediate router does not possess the encryption key. The system generates one or more interests for the data represented by the manifest, wherein a generated interest has a name that corresponds to a numbered chunk of the data represented by the manifest. The system transmits to the content-consuming computing device a content object received in response to a generated interest, wherein the intermediate router transmits the responsive content object without receiving a corresponding interest from the content-consuming computing device, thereby facilitating reduced network between the content-consuming computing device and the intermediate router.

In some embodiments, the intermediate router acts as an encryption performance enhancing proxy between the content-consuming computing device and a replica device. The content-consuming computing device and the intermediate router communicate over an air interface, and the intermediate router and the replica device communicate over a wired link.

In some embodiments, the first interest further includes an authentication token which is based on an authentication key, the encrypted signaling information, the encrypted inner interest, and data associated with the encrypted inner interest and the first interest. The system authenticates the first interest by verifying the authentication token based on the authentication key and the associated data. The system decrypts the signaling information included in the first interest based on the signaling key.

In some embodiments, in response to transmitting the first interest to a replica device, the system receives a first content object with signaling information encrypted based on the signaling key and that indicates an end chunk number, wherein generating the one or more interests further involves generating a number of interests equal to the end chunk number.

In some embodiments, in response to transmitting a generated interest to a replica device, the system receives a responsive content object with a name that corresponds to a numbered chunk of the data represented by the manifest. A numbered chunk corresponds to: a chunk created by a content producing device based on a division of a concatenation of the data represented by the manifest; or data for a leaf or a content object indicated in the manifest.

In some embodiments, in response to receiving one or more interests from the content-consuming computing device, the system forwards the received interests, wherein a received interest indicates a name for a branch of the manifest. The system transmits to the content-consuming computing device a content object received in response to a forwarded interest.

In some embodiments, the system receives a second interest that includes the first name, signaling information encrypted based on the signaling key and that indicates the manifest name, data encrypted based on the encryption key, and an authentication token based on the authentication key. The system authenticates the second interest by verifying the authentication token based on the authentication key. A generated interest of the one or more interests includes signaling information that indicates a request for a leaf of the manifest, and the content object received in response to the generated interest includes data corresponding to the requested manifest leaf.

In some embodiments, the system obtains the signaling key and the authentication key based on a key exchange protocol which is based on one or more of: a content centric network, wherein the intermediate router is known to the content-consuming computing device; and a dynamic proxy discovery, wherein the intermediate router is not known to the content-consuming computing device. The system updates an interest received during a second round of communication in the key exchange protocol based on the content centric network by adding a key share of the intermediate router to the interest, and transmits the updated interest to a replica device, which allows the replica device to return to the content-consuming computing device a responsive content object that includes the key share of the replica device and the key share of the intermediate router.

In some embodiments, a name is a hierarchically structured variable length identifier that includes contiguous name components ordered from a most general level to a most specific level. The name further includes one or more of: a routable name prefix for a replica device that hosts content; a session identifier; a transaction identifier; and a chunk number.

In some embodiments, the system receives a generates a first alert message which is one or more of: a close message that indicates a shutdown of a transaction associated with the transaction identifier or a shutdown of a session associated with the session identifier; and an error message that indicates an error. The system receives a second alert message which is one or more of: a rekey message that indicates a request from the content-consuming computing device or a replica device to establish a new set of session keys; and a keepalive message from the content-consuming computing device or the replica device that allows a receiving entity to return a message to a sending entity outside of the generated interests or a received content object.

Another embodiment provides a system that facilitates a secure encryption proxy in a content centric network. During operation, the system generates, by a content-consuming computing device, a first interest that includes a first name, signaling information encrypted based on a signaling key, and an inner interest encrypted based on an encryption key. The inner interest includes a name for a manifest that represents a collection of data. In response to transmitting the first interest to an intermediate router, the system receives one or more content object. A received content object includes a name that corresponds to a numbered chunk of the data represented by the manifest, and the content-consuming computing device is not required to transmit one or more corresponding interests for the one or more content objects, thereby facilitating reduced network traffic between the content-consuming computing device and the intermediate router.

In some embodiments, a received content object includes an authentication token which is based on an authentication key, the encrypted signaling information, the encrypted inner interest, and data associated with the encrypted inner interest and the first interest. The system authenticates a received content object by verifying the authentication token based on the authentication key and the associated data. The system decrypts the signaling information included in the received content object based on the signaling key, and the system decrypts encrypted data or the inner interest that is included in the received content object based on the encryption key.

In some embodiments, the system generates one or more interests, wherein a name for a generated interest indicates a name for a branch of the manifest. The system receives a content object in response to a generated interest.

In some embodiments, the system generates a second interest that includes the first name, signaling information encrypted based on the signaling key and that indicates the manifest name, data encrypted based on the encryption key, and an authentication token based on the authentication key. In response to transmitting the second interest to the intermediate router, the system receives one or more transport content objects. A received transport content object includes signaling information that indicates a request for a leaf of the manifest, and data corresponding to the requested manifest leaf.

In some embodiments, the system obtains the encryption key, the signaling key, and the authentication key based on a key exchange protocol which is based on one or more of: a content centric network, wherein the intermediate router is known to the content-consuming computing device; and a dynamic proxy discovery, wherein the intermediate router is not known to the content-consuming computing device. The system receives a responsive content object that includes the key share of a replica device and the key share of the intermediate router.

In some embodiments, the system receives or generates an alert message which is one or more of: a close message that indicates a shutdown of a transaction associated with the transaction identifier or a shutdown of a session associated with the session identifier; an error message that indicates an error; a rekey message that indicates a request from the content-consuming computing device or a replica device to establish a new set of session keys; and a keepalive message from the content-consuming computing device or the replica device that allows a receiving entity to return a message to a sending entity outside of the generated interests or a received content object.

Another embodiment provides a system that facilitates a secure encryption proxy in a content centric network. During operation, the system receives, by a replica device, a first interest that includes a first name, signaling information encrypted based on a signaling key, an inner interest encrypted based on an encryption key, and an authentication token based on an authentication key. The inner interest includes a name for a manifest that represents a collection of data. The system authenticates the first interest by verifying the authentication token based on the authentication key. The system generates a first content object that includes signaling information encrypted based on the signaling key and that indicates an end chunk number that corresponds to a number of chunks comprising the data represented by the manifest. The first content object further includes data represented by the manifest and that is encrypted based on the encryption key.

In some embodiments, in response to receiving a subsequent interest with a name that corresponds to a numbered chunk of the data represented by the manifest, the system generates a subsequent content object with data that corresponds to the numbered chunk.

In some embodiments, the system receives a second interest that includes the first name, signaling information encrypted based on the signaling key and that indicates the manifest name, data encrypted based on the encryption key, and an authentication token based on the authentication key. The system authenticates the second interest by verifying the authentication token based on the authentication key. A received subsequent interest includes signaling information that indicates a request for data represented by the manifest, and a generated subsequent content object includes signaling information that indicates the data represented by the manifest.

BRIEF DESCRIPTION OF THE DRAWINGS

In the figures, like reference numerals refer to the same figure elements.

DETAILED DESCRIPTION

Figure 1A:
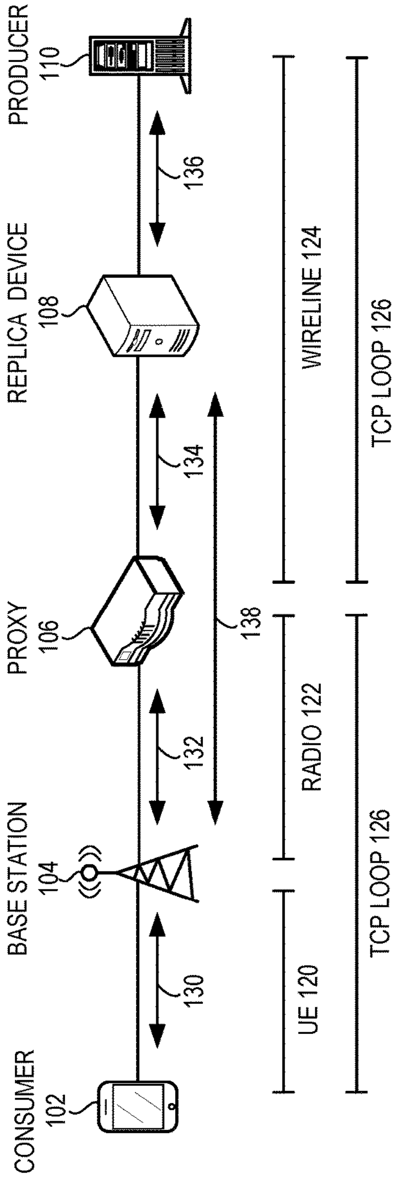
FIG. 1A illustrates an exemplary environment in the prior art for a proxy between a radio link and a wire line.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that solves the problem of relying on a PEP for encrypted traffic by providing an encryption performance enhancing proxy (ePEP) that can process encrypted traffic, where the system does not disclose any confidential information about the traffic to the ePEP. Current cellular network traffic carried over wireless links can be based on TCP, where digital content can travel over a radio link and over a wireline link.

However, because the radio link and the wireline link have different channel responses for a transport protocol, and because TCP cannot distinguish between the radio link and the wireline link, TCP may underestimate the end-to-end capacity. One solution is to split or proxy the topology by inserting a middle box (e.g., a performance enhancing proxy, or a PEP) which terminates the radio link transport loop and establishes a second transport loop to the wire-line system. This allows the transport protocols to optimize performance on each side of the proxy and keep the air interface full with a minimum of duplicate date due to TCP retransmission requests. However, today's network traffic uses an increased amount of encryption, which prevents a middle box (such as an PEP), from intercepting encrypted sessions. As a result, the PEP cannot proxy the encrypted traffic, as described below in relation to FIG. 1A. The encrypted traffic loses the benefit of the proxy over the wireless link, and the PEP is unable to do much more than packet shaping to adjust data rates.

Embodiments of the present invention provide an encryption performance enhancing proxy (ePEP), which can be an intermediate router that sits between a content-consuming computing device (e.g., a consumer) and a replica or a content producing device (e.g., a producer). The producer can provide all of its data to the replica. The system decouples the keys used to encrypt the underlying data from the keys used to encrypt or authenticate the data used for transporting the underlying data. For example, only the endpoints (e.g., the consumer and the producer) share the encryption key ("$K_E$") which is used to encrypt the underlying data, while the endpoints and the ePEP exchange both the signaling key ("$K_S$") which is used to encrypt signaling or transport information as well as the authentication key ("$K_A$") which is used to authenticate the underlying data in a packet. This allows the ePEP to participate in end-to-end signaling while it runs two different transport loops, and further allows the ePEP to process encrypted traffic, as described below in relation to FIG. 1B. An exemplary communication between a consumer, an ePEP, and a replica is described below in relation to FIG. 2A.

Thus, by decoupling the key distribution, the system can maintain end-to-end confidentiality, integrity, and authentication while benefiting from the performance improvements that a PEP can offer a mobile handset. Embodiments of the present invention result in increased efficiency in a network, specifically, in the communications or exchange of data between a content-consuming computing device (e.g., a mobile handset) and an ePEP over an air interface, and between the ePEP and a content hosting device (e.g., a replica) over a wireline link. The system of the present invention allows the ePEP to act as a semi-trusted middle box in a content centric network.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components pare, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

Exemplary Network (Prior Art)

FIG. 1A illustrates an exemplary environment in the prior art for a proxy between a radio link and a wireline. A content-consuming computing device 102 (such as a mobile handset or other consumer) can communicate with a base station 104 over a link 130 based on a user equipment (UE) protocol 120. Base station 104 can communication with a performance enhancing proxy (PEP) 106 over a link 132 based on a radio protocol 122. Proxy 106 can communicate with a replica device 108 over a link 134 based on a wireline protocol 124. Replica device 108 can communicate with a content producing device 110 (such as a producer) over a link 136 based on wireline protocol 124. Proxy 106 can terminate radio protocol 122 and establish a second transport loop based on wireline protocol 124. In other words, proxy 106 can run two TCP loops 126, one on each side of proxy 106. This allows for an optimization of performance on each side of proxy 106, and further keeps the air interface full with a minimum of duplicate data due to TCP retransmission requests. However, proxy 106 cannot process or intercept an encrypted session. This leads to unencrypted traffic traveling over links 130, 132, 134, and 136, while encrypted traffic from replica device 108 bypasses proxy 106, traveling instead via a link 138. This results in TCP underutilizing the wireless link. Current schemes like HTTPS and TLS prevent a PEP like proxy 106 from doing much more than packet shaping to adjust data rates.

Exemplary Network and Communication; Exemplary Keys

Figure 1B:
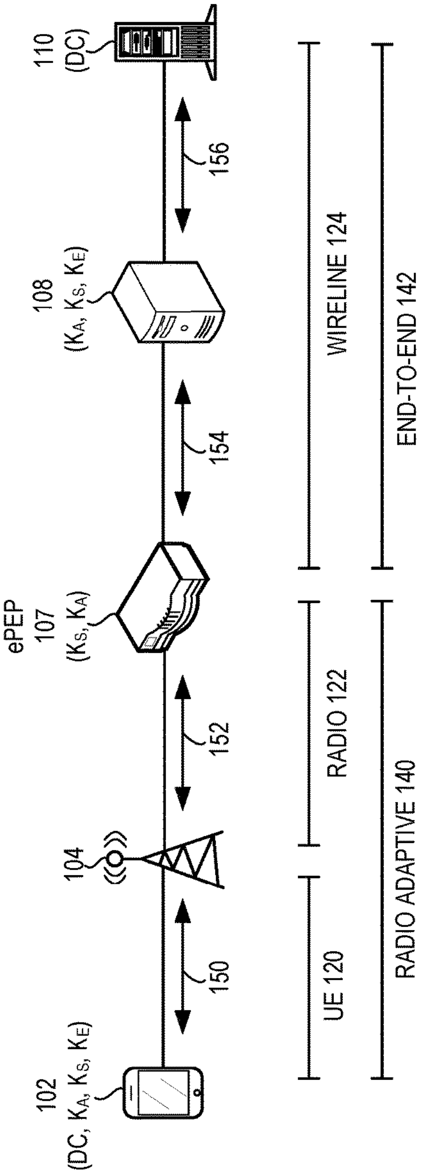
FIG. 1B illustrates an exemplary environment which facilitates a secure encryption proxy in a content centric network, in accordance with an embodiment of the present invention.

FIG. 1B illustrates an exemplary environment which facilitates a secure encryption proxy in a content centric network, in accordance with an embodiment of the present invention. FIG. 1B illustrates the same entities 102, 104, 108, and 110 as described above in relation to FIG. 1A. However, in place of proxy 106, FIG. 1B includes an ePEP 107, which operates in a CCN environment. The system depicted in FIG. 1B shares a set of keys (e.g., $K_A$, $K_S$, and $K_E$) between consumer 102 and replica 108, and a subset of those keys (e.g., $K_S$ and $K_A$) with ePEP 107. The system can run a radio adaptive link 140 on the air interface side between consumer 102 and ePEP 107, and can further run an end-to-end link 142 between ePEP 107 and replica 108 (or producer 110). This configuration allows a radio-aware transport protocol to execute on the radio side, and an Internet end-to-end transport protocol to operate on the wireline side. Furthermore, ePEP 107 can process all traffic, including both encrypted and unencrypted traffic (e.g., over links 150, 152, 154, and 156).

Figures 1C, 1D:
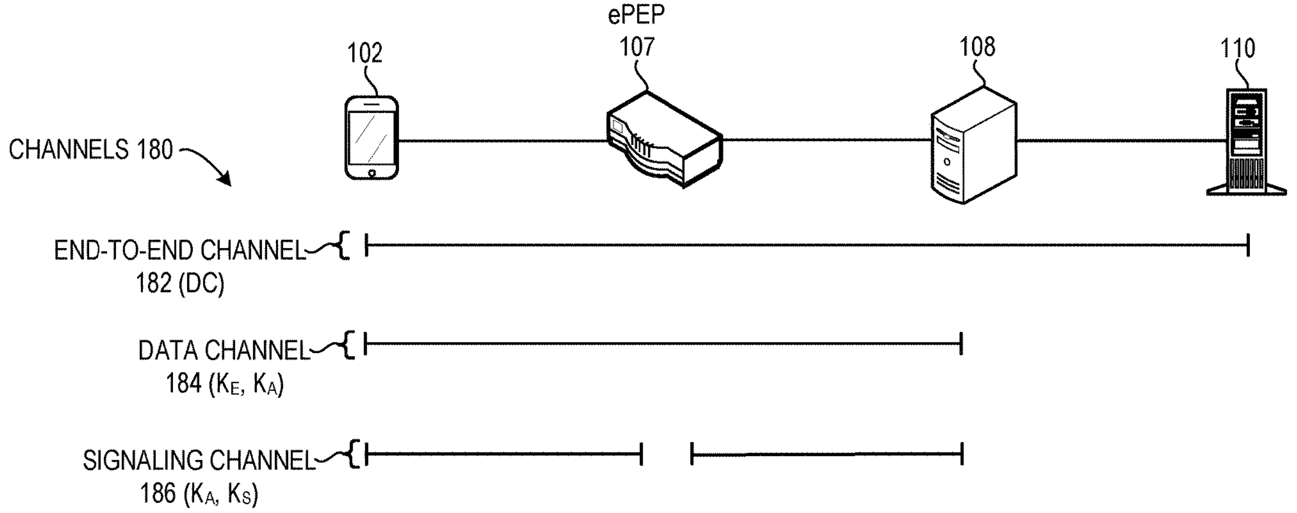
FIG. 1C illustrates an exemplary table with a key distribution which facilitates a secure encryption proxy in a content centric network, in accordance with an embodiment of the present invention.
FIG. 1D illustrates exemplary channels created corresponding to the key distribution of FIG. 1C, in accordance with an embodiment of the present invention.

FIG. 1C illustrates an exemplary table 160 with a key distribution which facilitates a secure encryption proxy in a content centric network, in accordance with an embodiment of the present invention. Table 160 includes entities 101, which correspond to consumer device 102, ePEP 107, replica 108, and producer 110 of FIG. 1B. Table 160 also includes keys 161, which include a public/private key pair 162 (e.g., a data certificate, or "DC"), an encryption key ($K_E$) 164, an authentication key ($K_A$) 166, and a signaling key ($K_S$) 168. Consumer 102 and producer 110 can exchange a public/private key pair (such as DC), where producer 110 signs a manifest that represents a collection of data. Secure manifests in a CCN are described in U.S. patent application Ser. No. 14/231,515. Consumer 102 and replica 108 can establish an encryption key ($K_E$), which is used to encrypt the underlying data. Consumer 102, replica 108, and ePEP 107 can establish a signaling key ($K_S$), which is used to encrypt information in a signaling channel, and an authentication key ($K_A$), which is used to verify or authenticate the underlying data in a packet. These keys can be established based on a key exchange protocol, as described below.

Logical Channels and Exemplary Formats for Packet Names

The keys $K_E$, $K_A$, and $K_S$ are used to secure and authenticate a logical data channel and a logical signaling (control) channel. FIG. 1D illustrates exemplary channels 180 created corresponding to the key distribution of FIG. 1C, in accordance with an embodiment of the present invention. Channels 180 can include: an end-to-end channel 182 between consumer 102 and producer 110, which is protected based on DC; a data channel 184 between consumer 102 and replica 108, which is protected based on $K_E$ and $K_A$; and signaling channels 186 between consumer 102 and ePEP 107, and between ePEP 107 and replica 108, which are protected based on $K_A$ and $K_S$. The system uses two logical channels per encryption context (e.g., a set of keys). Each encryption context is identified by a Session ID (SID). With a SID, the system multiplexes flows within logical transactions. The transactions are similar to HTTP/2 frames. Each transaction has a signaling channel and a data channel. In other words, an interest or content object packet involved in a transaction can carry both signaling information (to be carried via the signaling channel, encrypted based on $K_S$) and data (to be carried via the data channel, encrypted based on $K_E$).

The system can encapsulate in an outer interest, an encrypted inner interest (which includes an inner interest name), where the inner interest is encrypted based on $K_E$. The outer interest name can represent the encryption context. For example, one format for the outer interest name can be:

$$/\text{replica-prefix/SID=sid/chunk=}m \quad (1)$$

The name component "/replica=prefix" can be a routable name prefix of the replica; "SID=sid" can indicate the session identifier; and "chunk=m" can identify the specific chunk number. Format (1) corresponds to the SID-level control channel. With this naming context, a consumer, ePEP, or replica can exchange signaling information, e.g., to shut down an encryption context.

A second format for the outer interest name can be:

$$/\text{replica-prefix/SID=sid/}X\text{ID=}x\text{id/chunk=}n \quad (2)$$

The name component "XID=xid" can identify a specific transaction, and "chunk=n" can identify the specific chunk number. Format (2) corresponds to the XID-level control channel. With this naming context, the participating entities can exchange signaling information and data relevant to a particular consumer transaction.

Encrypting and Authenticating Data

In general, a consumer or replica can: 1) encrypt underlying data using $K_E$ ("EKE{data"}); 2) encrypt signaling information using $K_S$ (e.g., "E$K_S${signaling}"); and 3) sign the concatenation of these two encrypted field using $K_A$. Assume that the notation Ek{x} indicates to encrypt (and authenticate or decrypt) the element "x" under key "k," and the notation Sk{x} means to only authenticate x under key k. For example, based on an AEAD scheme such as AES-GCM, the consumer can compute a hash over 1), 2), and additional data using $K_A$, to produce an authentication token, which can be included in a packet. The additional data can be plaintext information associated with the encrypted data of 1) and 2) (e.g., associated data or "AD"). This can be written as:

$$S_{KA}\{AD\|E_{KA}\{\text{Signaling}\}\|E_{KE}\{\text{Data}\}\} \quad (3)$$

An alternate method that drops the authentication key but co-signs the hash is:

$$E_{KS}\{\text{Signaling},EDH\|E_{KE}\{\text{Data}\} \quad (4)$$

$$EDH=\text{Hash}\{E_{KE}\{\text{Data}\}\} \quad (5)$$

Thus, a consumer can generate and sign an interest packet using the above method (e.g., encrypting the data using $K_E$, encrypting the signaling information using $K_S$, and signing the encrypted information using $K_S$). An ePEP can receive the packet and authenticate the packet by verifying that a computation of a comparison authentication token (e.g., performing equation (3)) matches the authentication token included in the received packet. The ePEP can also decrypt and process the signaling information based on $K_S$, and subsequently forward the interest on to a replica. The replica can receive the packet and similarly authenticate the packet based on $K_A$. The replica can also decrypt and process both the signaling information based on $K_S$ and the data based on $K_E$. These communications are described below in relation to FIG. 2A.

Exemplary Communication with an ePEP, and Exemplary Packets

Figure 2A:
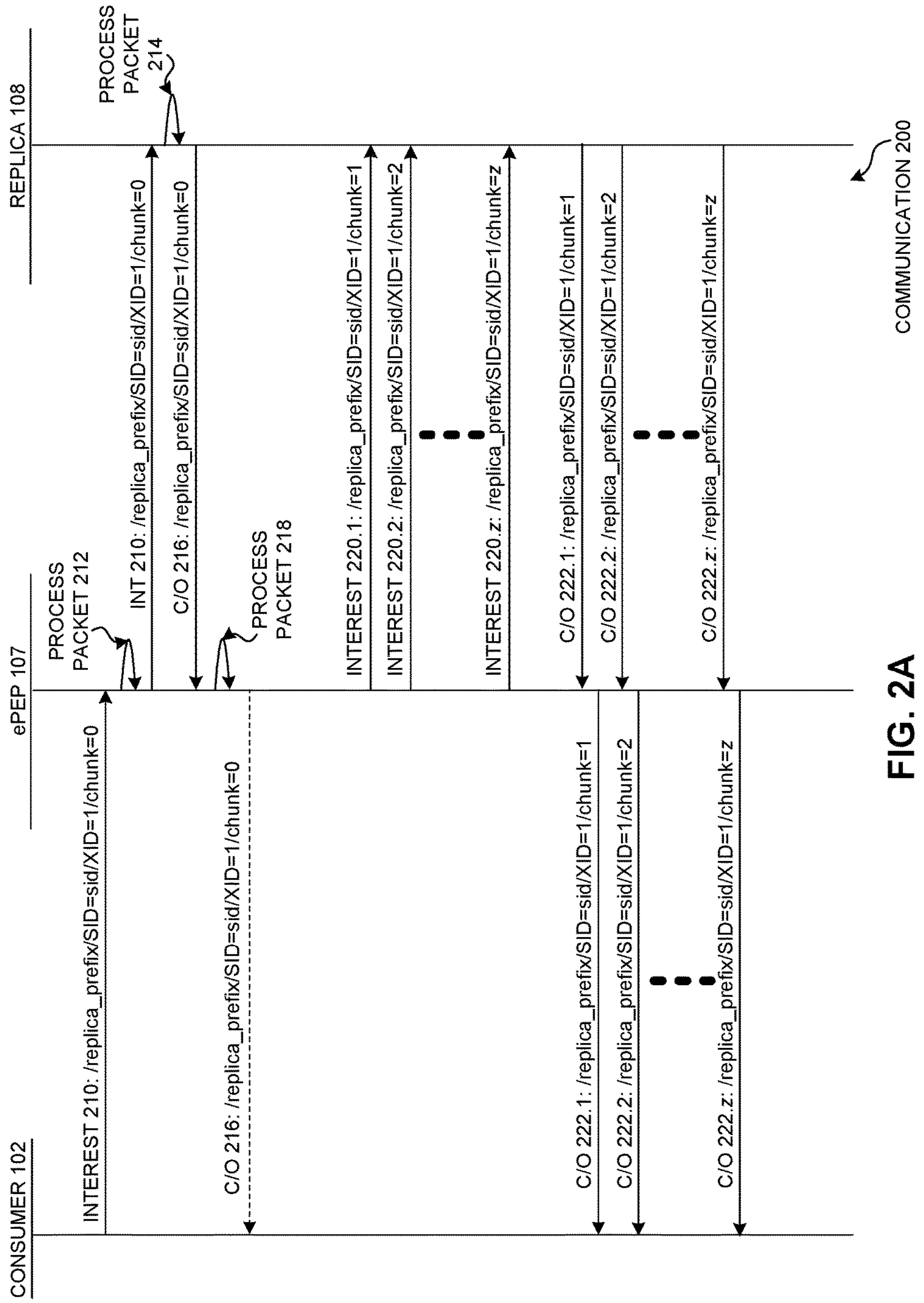
FIG. 2A illustrates an exemplary communication which facilitates a secure encryption proxy in a content centric network, in accordance with an embodiment of the present invention.

FIG. 2A illustrates an exemplary communication 200 which facilitates a secure encryption proxy in a content centric network, in accordance with an embodiment of the present invention. Communication 200 can occur between consumer 102, ePEP 107, and replica 108. Assume that the consumer knows the identity of the proxy. This may occur via on-line discovery, such as in multi-context Transport Layer Security (mcTLS), or via configuration, such as when a mobile node associates with a base station. mcTLS is described in Naylor et al., "Multi-context TLS (mcTLS): Enabling Secure In-Network Functionality in TLS," SIGCOMM Comput. Commun. Rev., 45(4):199-212, August 2015. Packets from the consumer are addressed to the replica (e.g., an interest name can include a routable name prefix for the replica, as in Formats (1) and (2)), not to the proxy, so the operating network uses a method to put the proxy on-path. In addition, assume that the consumer knows the identity of the replica. This may occur via the application, a name resolution service, or user actions. For example, a Foo application may ask ccnx:/foo for a set of replicas and be given the replica name. In another example, a mobile node may be configured with the local cache replica of the mobile operator.

Figure 2B:
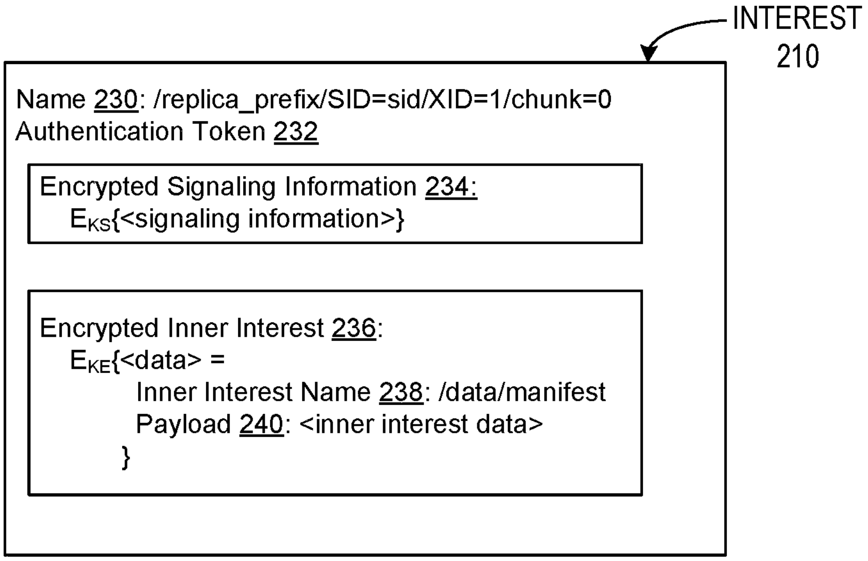
FIG. 2B illustrates an exemplary interest packet corresponding to a communication of FIG. 2A, in accordance with an embodiment of the present invention.

During operation, consumer 102 can generate an interest 210, which initializes state for a new transaction identifier XID of "1." FIG. 2B illustrates exemplary interest packet 210 corresponding to the communication of FIG. 2A, in accordance with an embodiment of the present invention. Interest 210 includes a name 230 of "/replica_prefix/SID=sid/XID=1/chunk=0," an authentication token 232, encrypted signaling information 234, and an encrypted inner interest 236 with an inner interest name 238 of "/data/manifest" and a payload 240 of "<inner interest data>." Returning to FIG. 2A, upon receiving interest 210, ePEP 107 can process the packet (function 212) by decrypting signaling information 234 based on the signaling key and authenticating the packet by verifying authentication token 232. For example, ePEP 107 can determine that there is no relevant signaling information in interest 210. ePEP 107 can also compute a comparison authentication token based on the authentication key $K_A$, encrypted signaling information 234, encrypted inner interest 236, and data associated with the encrypted inner interest (e.g., as shown in Equation (3)). If the computed token does not match authentication token 232, ePEP 107 can generate an error message, as described below in relation to FIG. 3C. If it does match, ePEP 107 can successfully verify interest 210 and forward interest 210 to replica 108.

Figure 2C:
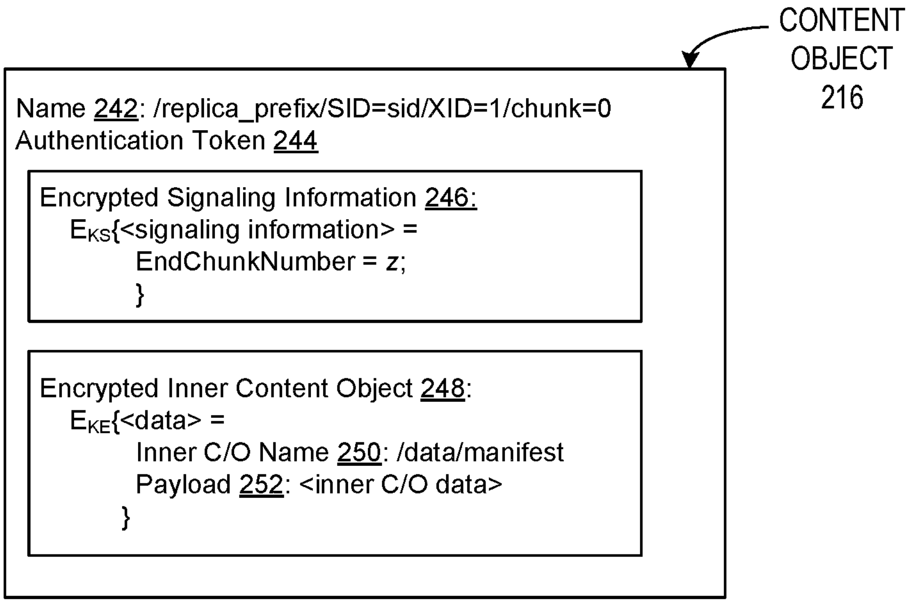
FIG. 2C illustrates an exemplary content object packet corresponding to a communication of FIG. 2A, in accordance with an embodiment of the present invention.
Figure 2D:
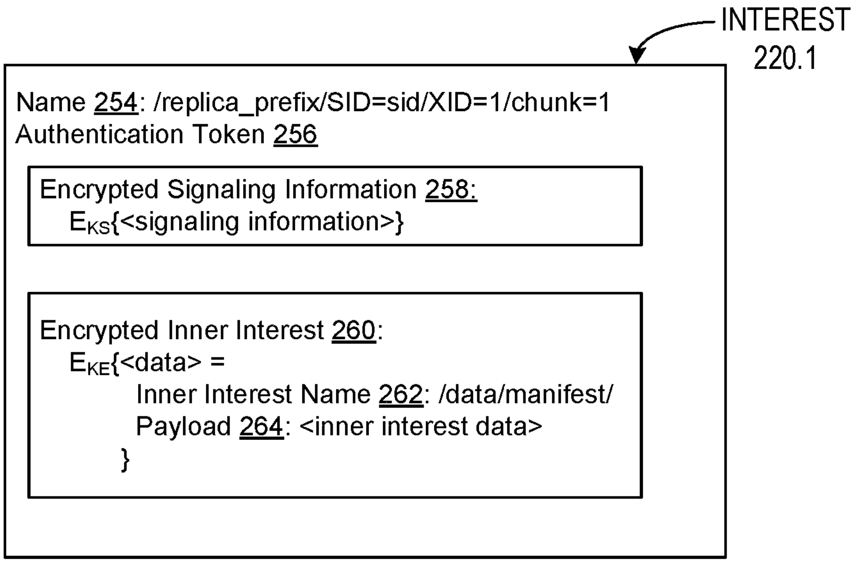
FIG. 2D illustrates an exemplary interest packet corresponding to a communication of FIG. 2A, in accordance with an embodiment of the present invention.

Replica 108 can similarly process the packet (function 214), by decrypting signaling information 234 and authenticating the packet by verifying authentication token 232. Replica 108 can further decrypt encrypted inner interest 236 based on the encryption key $K_E$ and obtain inner interest name 238 (and, if included, payload 240). Replica 108 can generate a responsive content object 216, which includes an encrypted inner content object corresponding to inner interest name 238. FIG. 2C illustrates exemplary content object packet 216 corresponding to the communication of FIG. 2A, in accordance with an embodiment of the present invention. Content object 216 includes a name 242 of "/replica_prefix/SID=sid/XID=1/chunk=0," an authentication token 244, encrypted signaling information 246, and an encrypted inner content object 248 with an inner content object name 250 of "/data/manifest" and a payload 252 of "<inner content object data>." Returning to FIG. 2A, upon receiving content object 216, ePEP 107 can process the packet (function 218), similar to function 212, by decrypting signaling information 246 based on the signaling key and authenticating the packet by verifying authentication token 244. For example, ePEP 107 can determine that signaling information 246 indicates that the end chunk number is equal to "z," and also authenticate the packet by verifying authentication token 244. ePEP 107 may also forward content object 216 to consumer 102. Consumer 102 may use the end chunk number to track the number of subsequently received content objects (e.g., 222.1-222.*z*, below).

ePEP 107 may now begin pipelining interests 220.1-220.*z* and receiving responsive content objects 222.1-222.*z* to retrieve the data represented by the manifest. FIG. 2D illustrates exemplary interest packet 220.1 corresponding to the communication of FIG. 2A, in accordance with an embodiment of the present invention. Interest 220.1 includes a name 254 of "/replica_prefix/SID=sid/XID=1/chunk=1," an authentication token 256, encrypted signaling information 258, and an encrypted inner interest 260 with an inner interest name 262 of "/data/manifest" and a payload 264 of "<inner interest data>." Returning to FIG. 2A, upon generating interest 220.1, ePEP 107 can forward interest 220.1 to replica 108.

Figure 2E:
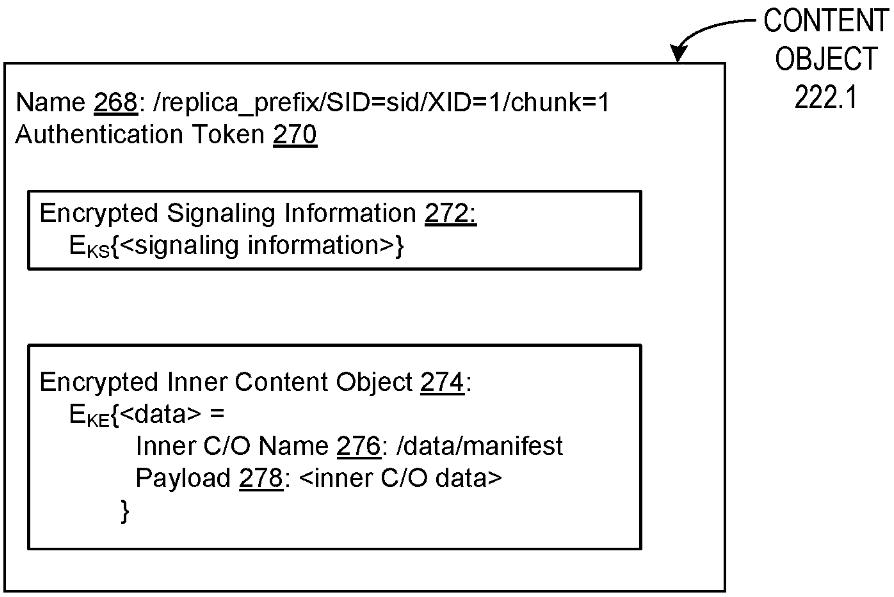
FIG. 2E illustrates an exemplary content object packet corresponding to a communication of FIG. 2A, in accordance with an embodiment of the present invention.

Replica 108 can process the packet (similar to function 214), and can further decrypt encrypted inner interest 260 based on the encryption key $K_E$ and obtain inner interest name 262 (and, if included, payload 264). Replica 108 can generate a responsive content object 222.1, which includes an encrypted inner content object corresponding to inner interest name 262. FIG. 2E illustrates exemplary content object packet 222.1 corresponding to the communication of FIG. 2A, in accordance with an embodiment of the present invention. Content object 222.1 includes a name 268 of "/replica_prefix/SID=sid/XID=1/chunk=1," an authentication token 270, encrypted signaling information 272, and an encrypted inner content object 274 with an inner content object name 276 of "/data/manifest" and a payload 278 of "<inner content object data>." Returning to FIG. 2A, upon receiving content object 222.1 (and content objects 222.2-222.*z*), ePEP 107 can process the packet (similar to function 218) by decrypting signaling information 272 based on the signaling key and authenticating the packet by verifying authentication token 270. ePEP 107 can forward content object 222.1 to consumer 102.

Consumer 102 can subsequently receive content object 222.1 (and content objects 222.2-222.*z*) and reassemble the manifest based on the received content objects. Note that all entities that receive a packet will process the packet, although the process packet functions 212, 214, and 218 are only shown in relation to the first full data exchange. For example, a process packet function can also occur: by replica 108 upon receiving interest 220.1; by ePEP 107 upon receiving content object 222.1; and by consumer 102 upon receiving content object 222.1.

Thus, consumer 102 can generate a single interest 210 for the manifest, and ePEP 107 can retrieve and forward the data represented by the manifest on behalf of consumer 102, which reduces traffic over the air interface between the consumer and the proxy by limiting the number of transmitted (and, correspondingly, re-transmitted) interests. This results in a more efficient system and use of the encryption performance enhancing proxy, and further allows ePEP 107 to process both unencrypted and encrypted traffic.

Exemplary Communication: Consumer Requests Manifest and Data Separately

Figure 2F:
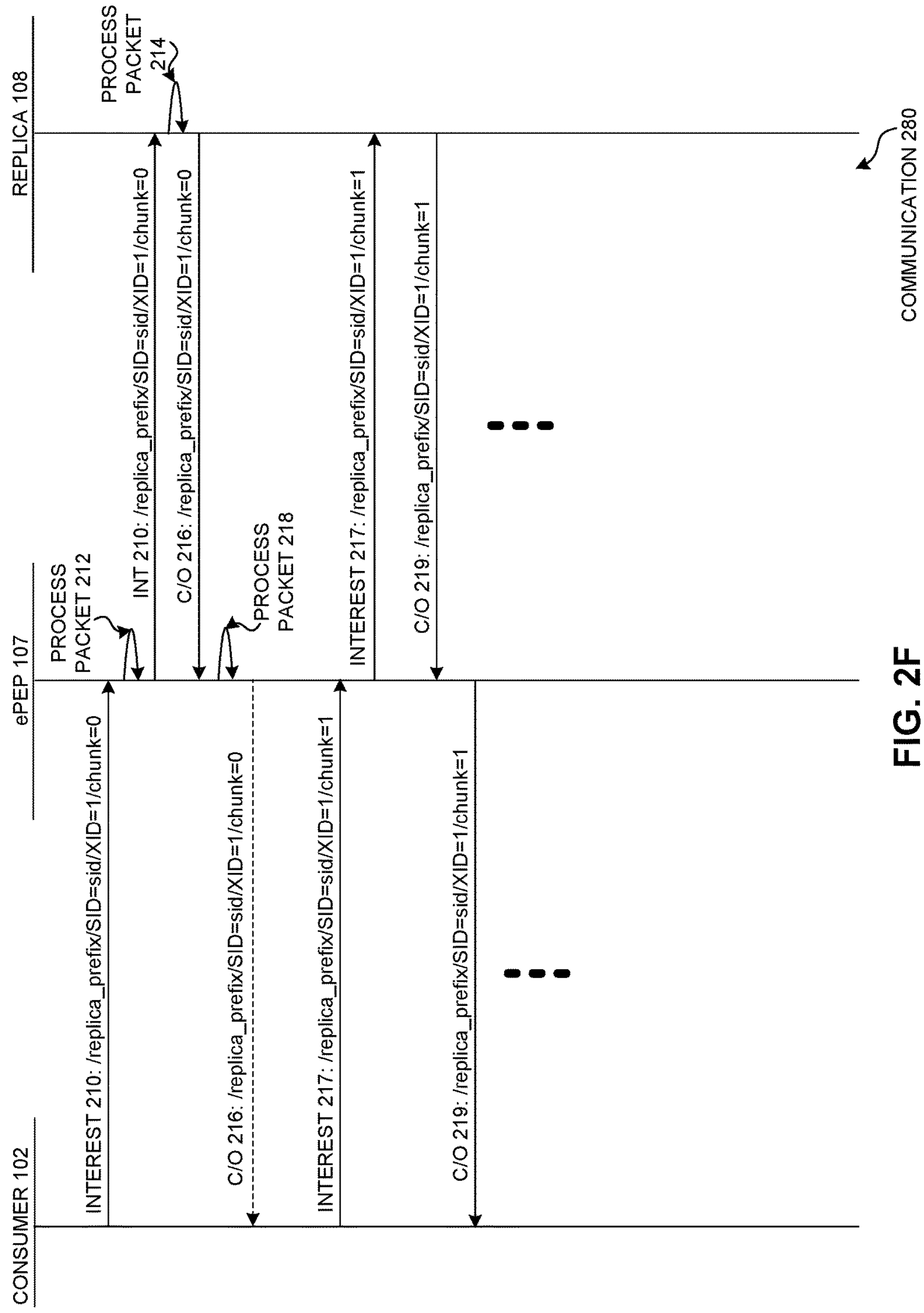
FIG. 2F illustrates an exemplary communication which facilitates a secure encryption proxy in a content centric network, where the consumer requests the manifest and the manifest data separately, in accordance with an embodiment of the present invention.

FIG. 2F illustrates an exemplary communication 280 which facilitates a secure encryption proxy in a content centric network, where the consumer requests the manifest and the manifest data separately, in accordance with an embodiment of the present invention. In communication 280, the first data exchange between consumer 102, ePEP 107, and replica 108 is the same (e.g., interest 210, functions 212 and 214, content object 216, and function 218). However, in communication 280, instead of ePEP 107 acting on behalf of consumer 102 to retrieve the manifest data (e.g., by pipelining interests 220.1-220.*z*), consumer 102 requests the manifest (all at once) separately from the data (e.g., the manifest branches). For example, upon receiving the manifest in content object 216, consumer 102 can generate an interest 217 for a manifest branch, with a name of "/replica_prefix/SID=sid/xid=1/chunk=1" and an encrypted inner interest name of "/data/manifestbranch." Replica 108 can return a responsive content object 219 with an inner content object that has data corresponding to the requested manifest branch. Consumer 102 can request the manifest branches as all in one streams, which still results in a substantial reduction of upstream traffic (i.e., by limiting the number of transmitted and re-transmitted interests sent over the air interface between consumer 102 and ePEP 107.

Figure 2G:
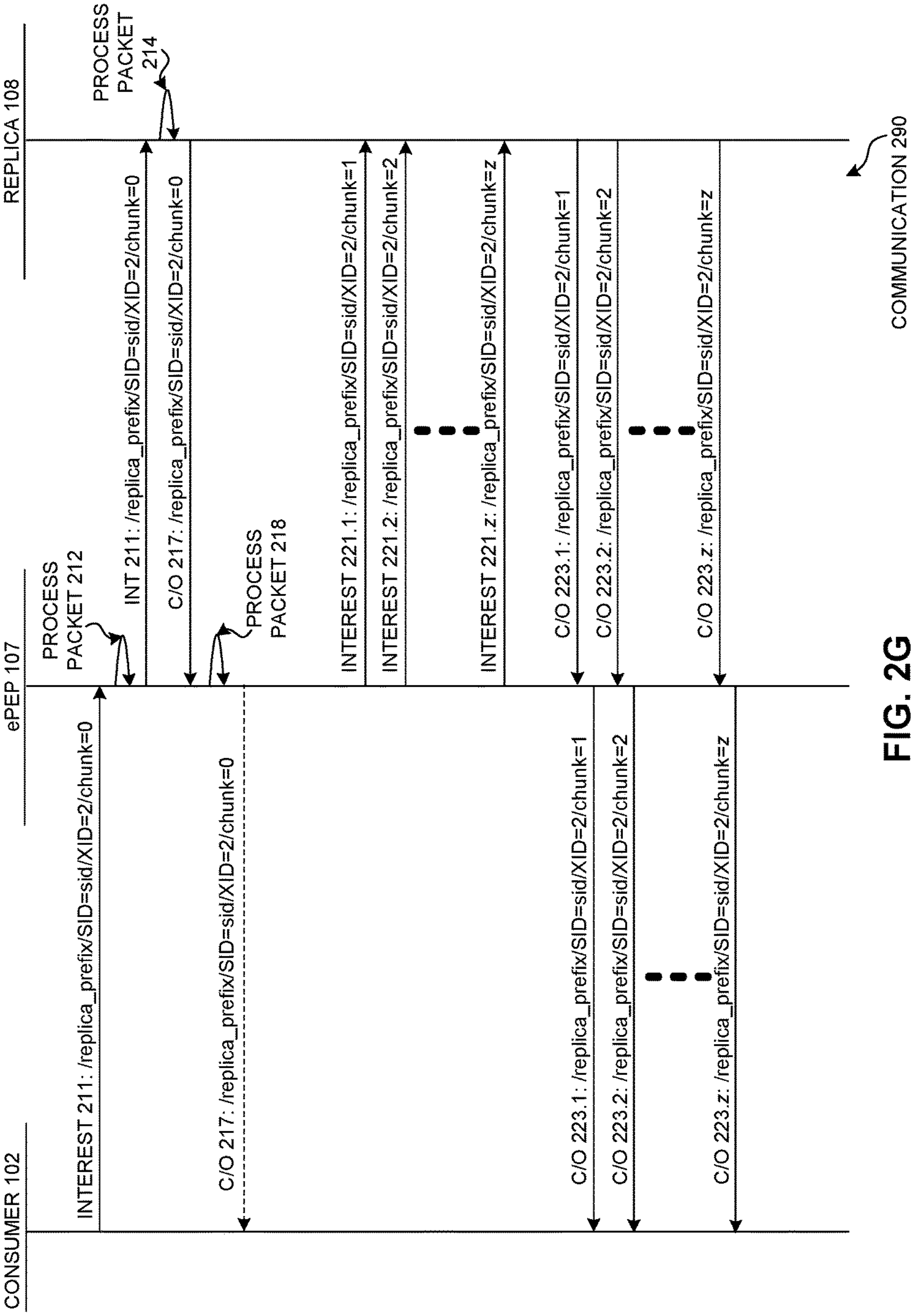
FIG. 2G illustrates an exemplary communication which facilitates a secure encryption proxy in a content centric network, where the consumer requests a transport manifest over the signaling channel, in accordance with an embodiment of the present invention.

Exemplary Communication: Consumer Requests Transport Manifest in Signaling Channel, and Exemplary Packets FIG. 2G illustrates exemplary communication 290 which facilitates a secure encryption proxy in a content centric network, where the consumer requests a transport manifest over the signaling channel, in accordance with an embodiment of the present invention. In communication 290, consumer 102 can request a transport manifest in the signaling channel, and ePEP 107 can begin retrieving the data based on the transport manifest. The data still remains in the data channel. The transport manifest is padded and encrypted with $K_E$ and authenticated with $K_A$ to prevent information leakage.

Figure 2H:
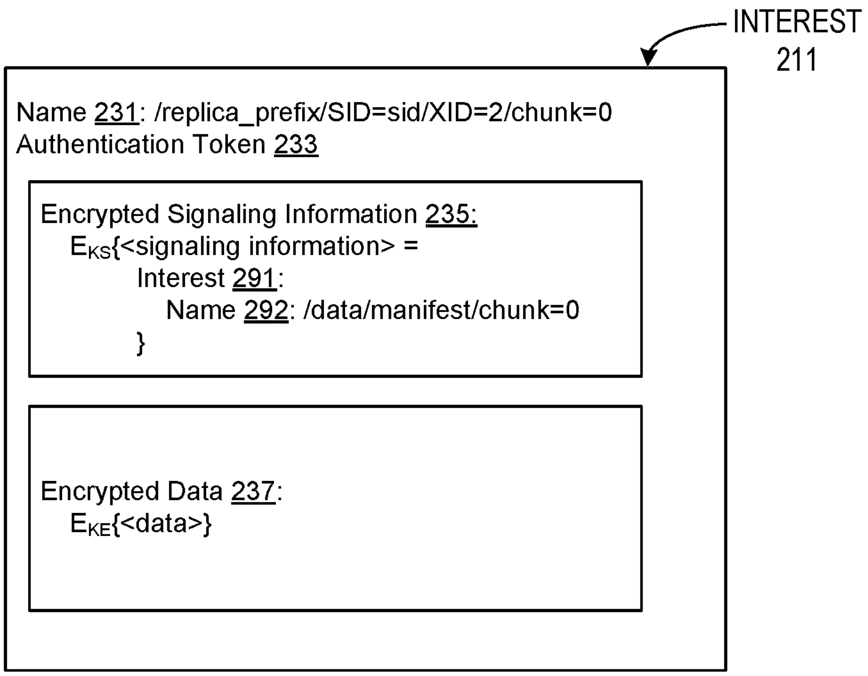
FIG. 2H illustrates an exemplary interest packet corresponding to a communication of FIG. 2G, in accordance with an embodiment of the present invention.
Figure 2I:
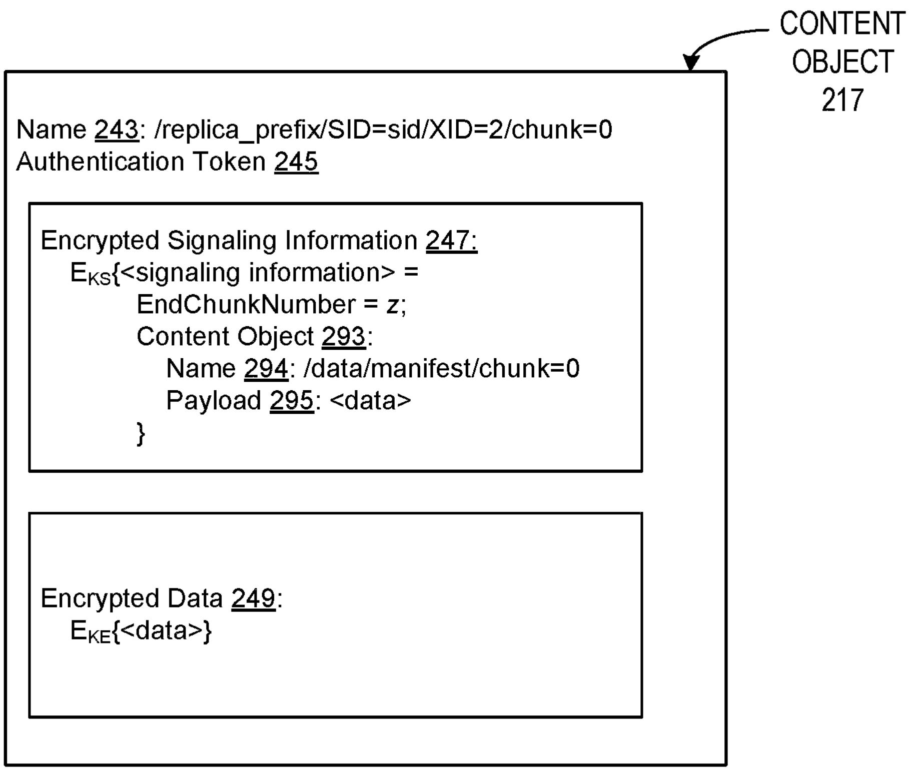
FIG. 2I illustrates an exemplary content object packet corresponding to a communication of FIG. 2G, in accordance with an embodiment of the present invention.

During operation, consumer 102 can generate an interest 211, which initializes state for a new transaction identifier XID of "2." FIG. 2H illustrates exemplary interest packet 211 corresponding to the communication of FIG. 2G, in accordance with an embodiment of the present invention. Interest 211 includes a name 231 of "/replica_prefix/SID=sid/XID=2/chunk=0," an authentication token 233, encrypted signaling information 235 which includes an interest 291 with a name 292 of "klata/manifest/chunk=0," and encrypted data 237. Returning to FIG. 2G, upon receiving interest 211, ePEP 107 can process the packet (function 212, as described above). For example, ePEP 107 can decrypt encrypted signaling information 235 to obtain name 292, and can successfully verify interest 211 and forward interest 211 to replica 108.

Replica 108 can process the packet (function 214, as described above), by decrypting signaling information 235 to obtain encrypted interest 291 and name 292, and authenticating the packet by verifying authentication token 233. Replica 108 can generate a responsive content object 217, which includes an encrypted inner content object corresponding to name 292. FIG. 21 illustrates exemplary content object packet 217 corresponding to the communication of FIG. 2G, in accordance with an embodiment of the present invention. Content object 217 includes a name 243 of "/replica_prefix/SID=sid/XID=2/chunk=0," an authentication token 245, encrypted signaling information 247, and encrypted data 249. Encrypted signaling information 237 can include an end chunk number with a value equal to "z," and an encrypted inner content object 293 with an inner content object name 294 of "/data/manifest/chunk=0," and a payload 295 of "<data>."

Figure 2J:
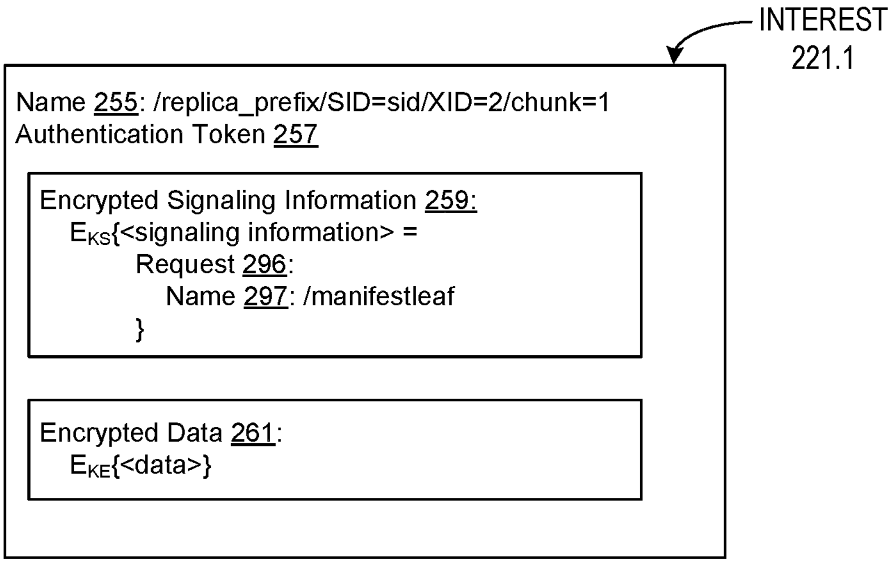
FIG. 2J illustrates an exemplary interest packet corresponding to a communication of FIG. 2G, in accordance with an embodiment of the present invention.

Returning to FIG. 2G, upon receiving content object 217, ePEP 107 can process the packet (function 218, as described above) by decrypting signaling information 247 based on the signaling key and authenticating the packet by verifying authentication token 245. For example, ePEP 107 can determine that signaling information 246 indicates that the end chunk number is equal to "z." ePEP 107 can further obtain content object 293, which includes the manifest. ePEP 107 may also forward content object 216 to consumer 102. Consumer 102 may use the end chunk number to track the number of subsequently received content objects (e.g., 223.1-223.*z*, below).

ePEP 107 may now begin pipelining interests 221.1-221.*z* and receiving responsive content objects 223.1-223.*z* to retrieve the data represented by the manifest. ePEP 107 can use the signaling channel to request the manifest leaves. The responsive content objects received from replica 108 may still be carried in the data channel, thereby maintaining the protection of the underlying data based on the encryption key $K_E$, which is only known to consumer 102 and replica 108, and not known to ePEP 107. FIG. 2J illustrates exemplary interest packet 221.1 corresponding to the communication of FIG. 2G, in accordance with an embodiment of the present invention. Interest 221.1 includes a name 255 of "/replica_prefix/SID=sid/XID=2/chunk=1," an authentication token 257, encrypted signaling information 259, and encrypted data 261. Encrypted signaling information 259 can indicate a request 296 and a name 297 of "/manifestleaf." Returning to FIG. 2G, upon generating interest 221.1, ePEP 107 can forward interest 221.1 to replica 108.

Figure 2K:
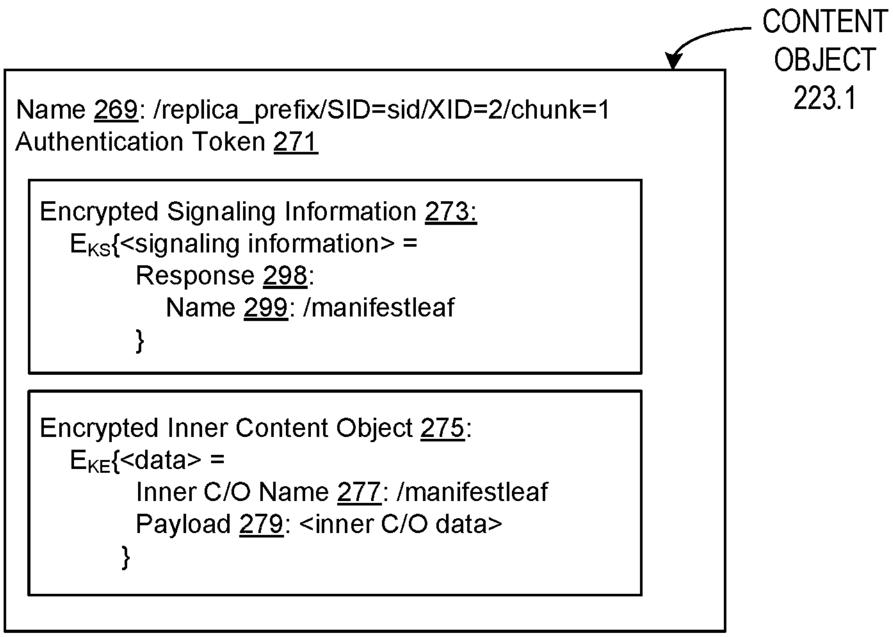
FIG. 2K illustrates an exemplary content object packet corresponding to a communication of FIG. 2G, in accordance with an embodiment of the present invention.

Replica 108 can process the packet (similar to function 214, as described above), and can decrypt encrypted signaling information 259 based on the signaling key $K_S$ and obtain inner interest name 297. Replica can also decrypt encrypted data 261 based on encryption key $K_E$. Replica 108 can generate a responsive content object 223.1, which includes an encrypted inner content object corresponding to inner interest name 297. FIG. 2K illustrates exemplary content object packet 223.1 corresponding to the communication of FIG. 2G, in accordance with an embodiment of the present invention. Content object 223.1 includes a name 269 of "/replica_prefix/SID=sid/XID=2/chunk=1," an authentication token 271, encrypted signaling information 273, and an encrypted inner content object 275 with an inner content object name 277 of "/manifestleaf" and a payload 279 of "<inner content object data>." Encrypted signaling information 273 can indicate a response 298 and a name 299 of "/manifestleaf." Returning to FIG. 2G, upon receiving content object 223.1 (and content objects 223.2-223.*z*), ePEP 107 can process the packet (similar to function 218) by decrypting signaling information 273 based on the signaling key $K_S$ and authenticating the packet by verifying authentication token 271. ePEP 107 can forward content object 222.1 to consumer 102.

Consumer 102 can subsequently receive content object 223.1 (and content objects 223.2-223.*z*) and reassemble the manifest based on the received content objects (i.e., the manifest leaves). Thus, consumer 102 can generate a single interest 211 for a transport manifest in the signaling channel, and ePEP 107 can retrieve and forward the data represented by the manifest on behalf of consumer 102, which reduces traffic over the air interface between the consumer and the proxy by limiting the number of transmitted (and, correspondingly, re-transmitted) interests. This results in a more efficient system and use of the ePEP, and further allows ePEP 107 to process both unencrypted and encrypted traffic.

In some embodiments, the consumer can drive all interest traffic with consumer-to-replica interests in the data channel, and the proxy can shape the interests within the XID to achieve the proper wireline downlink capacity to keep the radio link saturated. In this case, the only messages in the signaling channel are CLOSE messages.

Alert Messages

The system can send different types of alert messages, based on various conditions. The alert messages can include: REKEY, CLOSE, ERROR, and KEEPALIVE. An ERROR message implies a CLOSE. If a message or packet fails authentication, the consumer, ePEP, or replica may send a CLOSE message for the corresponding transaction identifier, which indicates a shutdown of the transaction associated with that XID. A CLOSE message may also be sent for a corresponding session identifier, which indicates a shutdown of the session associated with the SID. When the consumer is done reading from a transaction, the consumer sends a CLOSE message. The ePEP will forward the CLOSE message to the replica, and the replica responds with its own CLOSE message in the downstream signaling channel. If the consumer does not receive this downstream CLOSE message, the CLOSE message may time out, and the replica may re-send the CLOSE message or may shut down the XID. If the consumer receives a CLOSE response on a SID for a non-existent XID, the consumer can send an ERROR in the SID control channel to the replica, which will cause the replica to destroy the XID.

In addition, a replica may shutdown an XID at any time. For example, the replica may place a CLOSE or ERROR message in the response to any outer pending interest from the consumer. The replica does not put any data in the data channel. This may cause an imbalance between pending interests and returning content objects in the data channel. However, because the replica indicated a CLOSE or ERROR message, the replica will have flushed any remaining data, rending this issue irrelevant.

A consumer or a producer may request a REKEY at any time. The REKEY message can be carried in the first outer namespace (as shown in Format (1)): "/replica_prefix/SID=sid/Chunk=m." A REKEY message causes all parties to negotiate new session keys (e.g., via a key exchange protocol such as the one described in U.S. patent application Ser. No. 14/927,034, also known as CCN×$K_E$). A REKEY message results in a new SID. Any existing open XIDs carry over to the new SID. Once the new SID is in operation, the consumer and the producer terminate the old SID with CLOSE messages, but keep the XIDs open. Carrying over an XID allows the chunk number of the XID to remain intact.

The communication described for embodiments of the present invention is always initiated by the consumer to the replica, based on a routable prefix of the replica. The replica has no way on its own to obtain a name for the consumer or to send a packet directly to the consumer outside of the responsive content objects to the received interests from the consumer. Thus, the asymmetric nature of the protocol does not allow the replica to send a message to the consumer unless it is in response to an interest sent by and received from the consumer. Furthermore, because the channel is simplex, the consumer must give the replica a chance to send the consumer control messages on the channel. The consumer can thus send KEEPALIVE messages to the producer at a negotiated rate or interval (e.g., every 30 seconds). The producer can then respond with its own KEEPALIVE or a REKEY or a CLOSE message. This maintains the interest/content object flow balance in this control channel.

Methods for Key Exchange in Facilitating a Secure Encryption Proxy

When the consumer has prior knowledge of the proxy, the consumer can establish session keys (e.g., $K_E$, $K_A$, and $K_S$) with the replica (e.g., via CCN×$K_E$). The consumer can also establish a key control channel with the proxy (e.g., via CCN×$K_E$) for the express purpose of providing $K_A$ and $K_S$ to the proxy.

When the consumer does not have prior knowledge of the proxy, the protocol can use a method similar to the one used in mcTLS for deriving the keys. The consumer and the replica can establish the session keys $K_E$, $K_A$, and $K_S$ (via CCN×$K_E$) by exchanging messages in a series of rounds, as described in relation to U.S. patent application Ser. No. 14/927,034. The proxy may terminate a second round of communication from the consumer to the replica, where the second round interest includes the secret key share of the consumer. The proxy can add the proxy's own secret key share to the second round interest, and forward the modified interest on to the replica. The replica can verify both the key share of the consumer and the key share of the proxy, and return a second round content object that includes the replica's secret key share. Thus, the consumer receives both the key share of the replica and the proxy, which allows the consumer to immediately establish a session, thereby avoiding an additional round trip.

Assume that the consumer communicates with the replica or the producer through the proxy, and further assume that the consumer trusts the replica or producer (e.g., through server validation). For n>1 proxies, there are n different security contexts derived using mcTLS. Each context is set to the name of the entity or proxy and its KeyID with the appropriate string, e.g., "ka," where three keys strings "ka," "ke," and "ks" are supported. An example of a context is shown below:

$$\text{context}=\text{“proxy}A\text{”}\|\text{“}0x1abc2901\ldots\text{”}\|\text{“}ka\text{”} \tag{6}$$

Each party can establish a pair-wise shared key via CCN×$K_E$. For example, pair-wise keys are created for the consumer and the proxy, the proxy and the replica, and the consumer and the replica. After this step, the context keys $K_E$, $K_A$, and $K_S$ are created based on the per-context derivation technique described in mcTLS. Specifically, the consumer and the replica generate per-context keys using the following technique:

$$K_i^C=PRF_{S_{c\text{-}r}}(\langle\text{context}\rangle\|\text{rand}_C)| \tag{7}$$

$K_i^C$ is a context key derived at the consumer, $S_{c\text{-}r}$ is the traffic secret derived between the consumer and the replica via CCN×$K_E$, <context> is the context string defined above in Equation (6) (for the appropriate key), and randy is fresh randomness generated by the consumer and given to the replica or producer in the CCN×$K_E$ exchange. After these keys are created, the consumer and the replica share them with the middlebox(es) (e.g., the proxy or proxies) as needed by encrypting them with the appropriate pair-wise keys. For example, because the proxy needs to obtain both $K_S$ and $K_A$, the keys $K_S^C$, $K_S^R$, $K_a^C$, and $K_a^R$ are shared with the proxy. The final computation to derive $K_A$ and $K_S$ from these values is as follows:

$$Ka<-PRF_{K_a^C|K_a^R}(<'ka'\|\text{rand}_C\|\text{rand}_R)| \tag{8}$$

The entire exchange requires two "protocol executions": a first round of CCN×$K_E$ to establish shared keys between each party; and a second round to establish and share per-context (per-proxy transport keys) with each party and each allocated middlebox.

mcTLS Support

The ePEP design can be emulated with mcTLS on top of IP. Within a single mcTLS session with at least one proxy, define two contexts for a single transaction: one for signaling information and for data information. The consumer and replica should not share the reader or write keys for the data context with the proxy. The proxy should only receive the signaling context keys. Afterwards, the consumer and replica should use the data context to transport application data and the signaling context to share transport-related information with all parties, including the proxy. The use of these channels follows as described herein. If more than one transaction is needed in a session, then more than one pair of context channels (signaling and data) should be created and shared appropriately. There is no restriction on the amount of channels that can be created.

Intermediate Router (or ePEP) Facilitates a Secure Encryption Proxy

Figure 3A:
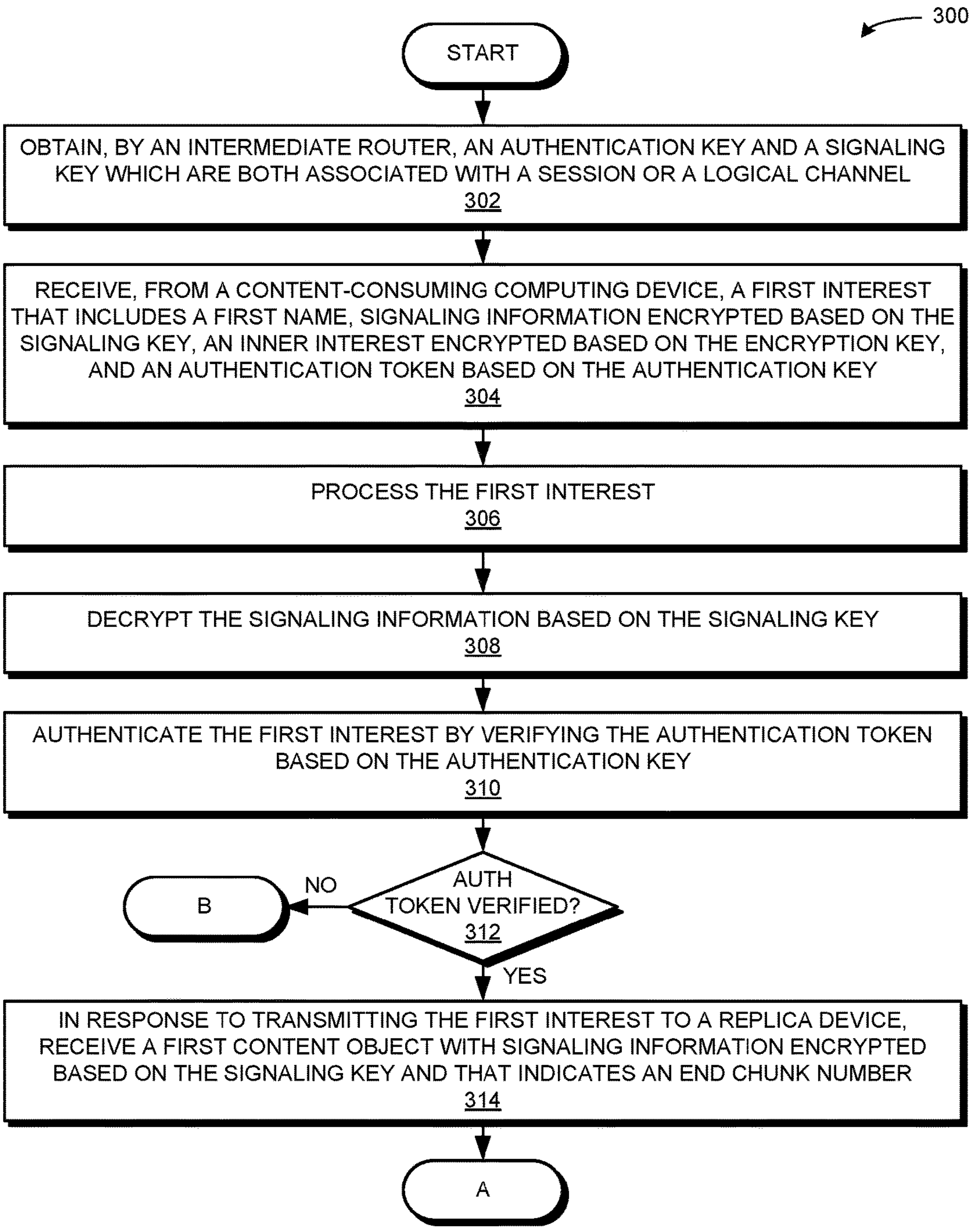
FIG. 3A presents a flow chart illustrating a method by an intermediate router for facilitating a secure encryption proxy in a content centric network, in accordance with an embodiment of the present invention.

FIG. 3A presents a flow chart 300 illustrating a method by an intermediate router for facilitating a secure encryption proxy in a content centric network, in accordance with an embodiment of the present invention. During operation, the system obtains, by the intermediate router, an authentication key $K_A$ and a signaling key $K_S$ which are both associated with a session or a logical channel (operation 302). The intermediate router can be an ePEP which cannot obtain the encryption key $K_E$. Exemplary key exchange protocols are described above. The system receives, from a content-consuming computing device, a first interest that includes a first name, signaling information encrypted based on the signaling key, an inner interest encrypted based on the encryption key, and an authentication token based on the authentication key (operation 304). The inner interest includes a name for a manifest that represents a collection of data. The system processes the first interest (operation 306). The system decrypts the signaling information based on the signaling key (operation 308). The system authenticates the first interest by verifying the authentication token based on the authentication key (operation 310) (as described in relation to Equations (3), (4), and (5)). If the authentication token is not successfully verified (decision 312), the operation continues as described at Label B of FIG. 3C. If the authentication token is successfully verified (decision 312), in response to transmitting the first interest to a replica device, the system receives a first content object with signaling information encrypted based on the signaling key and that indicates an end chunk number (operation 314), and the operation continues as described at Label A of FIG. 3B. The end chunk number can correspond to a number of chunks, where a numbered chunk can correspond to: a chunk created by a content producing device based on a division of a concatenation of the data represented by the manifest (e.g., by slicing up a .tar file); or data for a leaf or a content object indicated in the manifest.

Figure 3B:
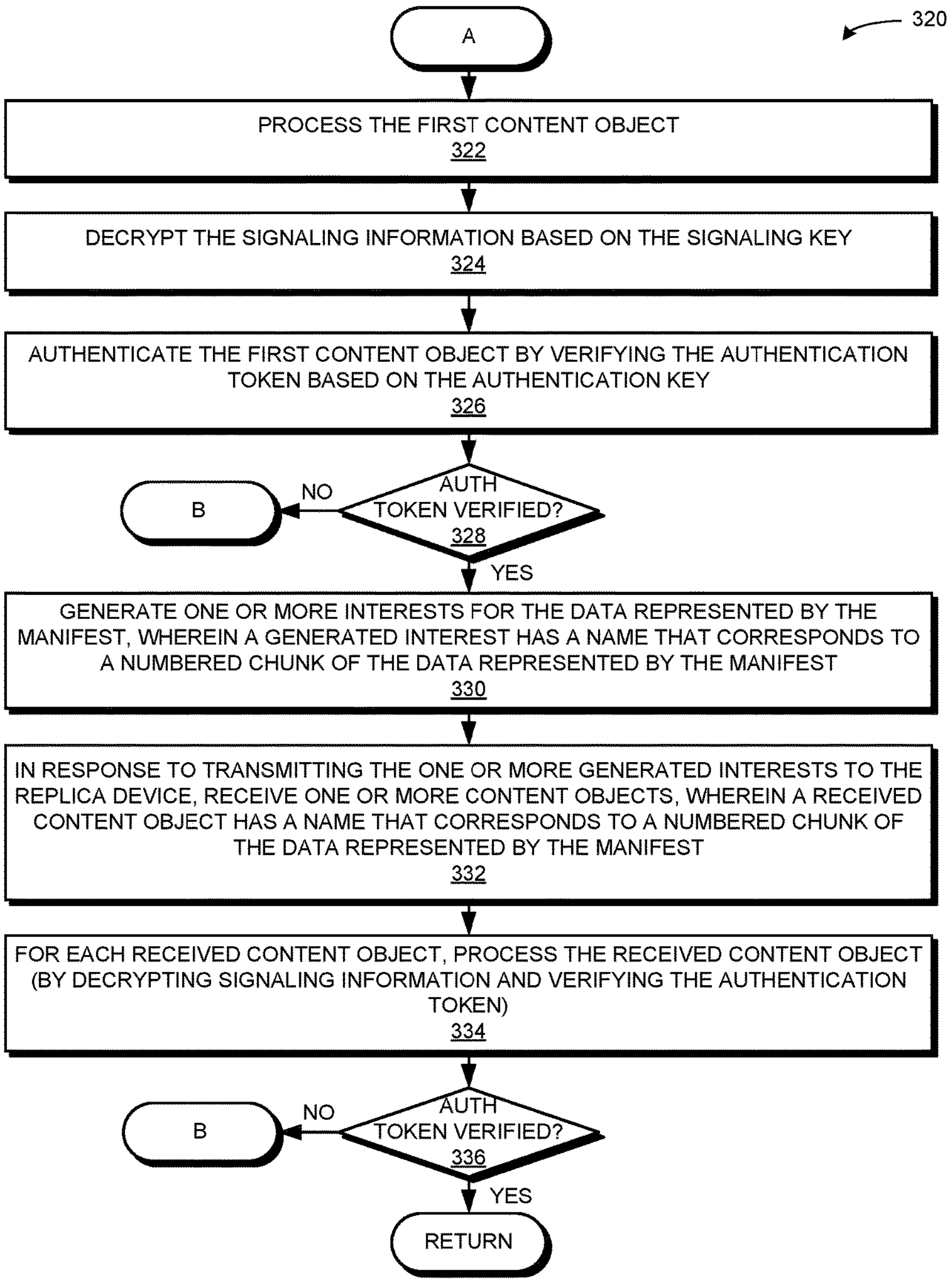
FIG. 3B presents a flow chart illustrating a method by an intermediate router for facilitating a secure encryption proxy in a content centric network, in accordance with an embodiment of the present invention.

FIG. 3B presents a flow chart 320 illustrating a method by an intermediate router for facilitating a secure encryption proxy in a content centric network, in accordance with an embodiment of the present invention. During operation, the system processes the first content object (operation 322). The system decrypts the signaling information based on the signaling key (operation 324). The system authenticates the first content object by verifying the authentication token based on the authentication key (operation 326). If the authentication token is not successfully verified (decision 328), the operation continues as described at Label B of FIG. 3C. If the authentication token is successfully verified (decision 328), the system generates one or more interests for the data represented by the manifest, wherein a generated interest has a name that corresponds to a numbered chunk of the data represented by the manifest (operation 330). In response to transmitting the one or more generated interests to the replica device, the system receives one or more content objects, wherein a received content object has a name that corresponds to a numbered chunk of the data represented by the manifest (operation 332). For each received content object, the system processes the received content object (by decrypting the signaling information and verifying the authentication token) (operation 334).

Figure 3C:
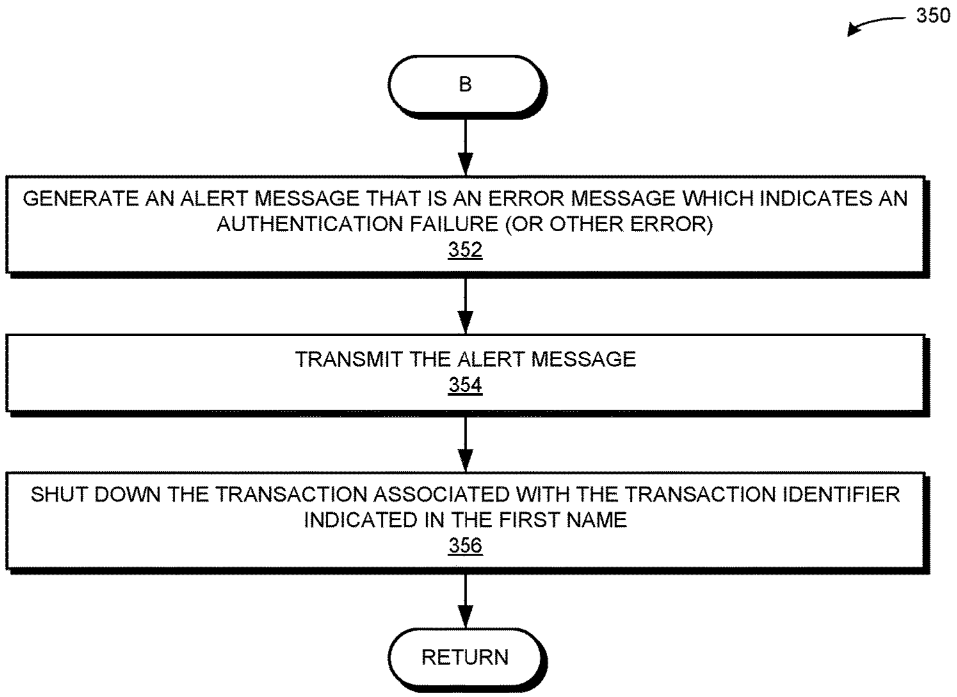
FIG. 3C presents a flow chart illustrating a method for handling an error in a system which facilitates a secure encryption proxy in a content centric network, in accordance with an embodiment of the present invention.

If the authentication token is not successfully verified (decision 336), the operation continues as described at Label B of FIG. 3C. If the authentication token is successfully verified (decision 336), the operation returns.

Method for Handling an Error Message

FIG. 3C presents a flow chart 350 illustrating a method for handling an error in a system which facilitates a secure encryption proxy in a content centric network, in accordance with an embodiment of the present invention. During operation, a device (such as a content-consuming computing device, an ePEP, a replica device, or a content producing device) generates an alert message that is an error message which indicates an authentication failure or other error (operation 352). The system transmits the alert message (operation 354). For example: the ePEP can transmit the alert message to the content-consuming computing device and the replica device; the content-consuming computing device can transmit the alert message to the ePEP and the replica; or the replica device can transmit the alert message to the content-consuming computing device and the ePEP. Other types of alert messages are described above (e.g., CLOSE, ERROR, REKEY, and KEEPALIVE). The system shuts down the transaction associated with the transaction identifier indicated in the first name of the first interest (operation 356).

Content-Consuming Computing Device Facilitates a Secure Encryption Proxy

Figure 4A:
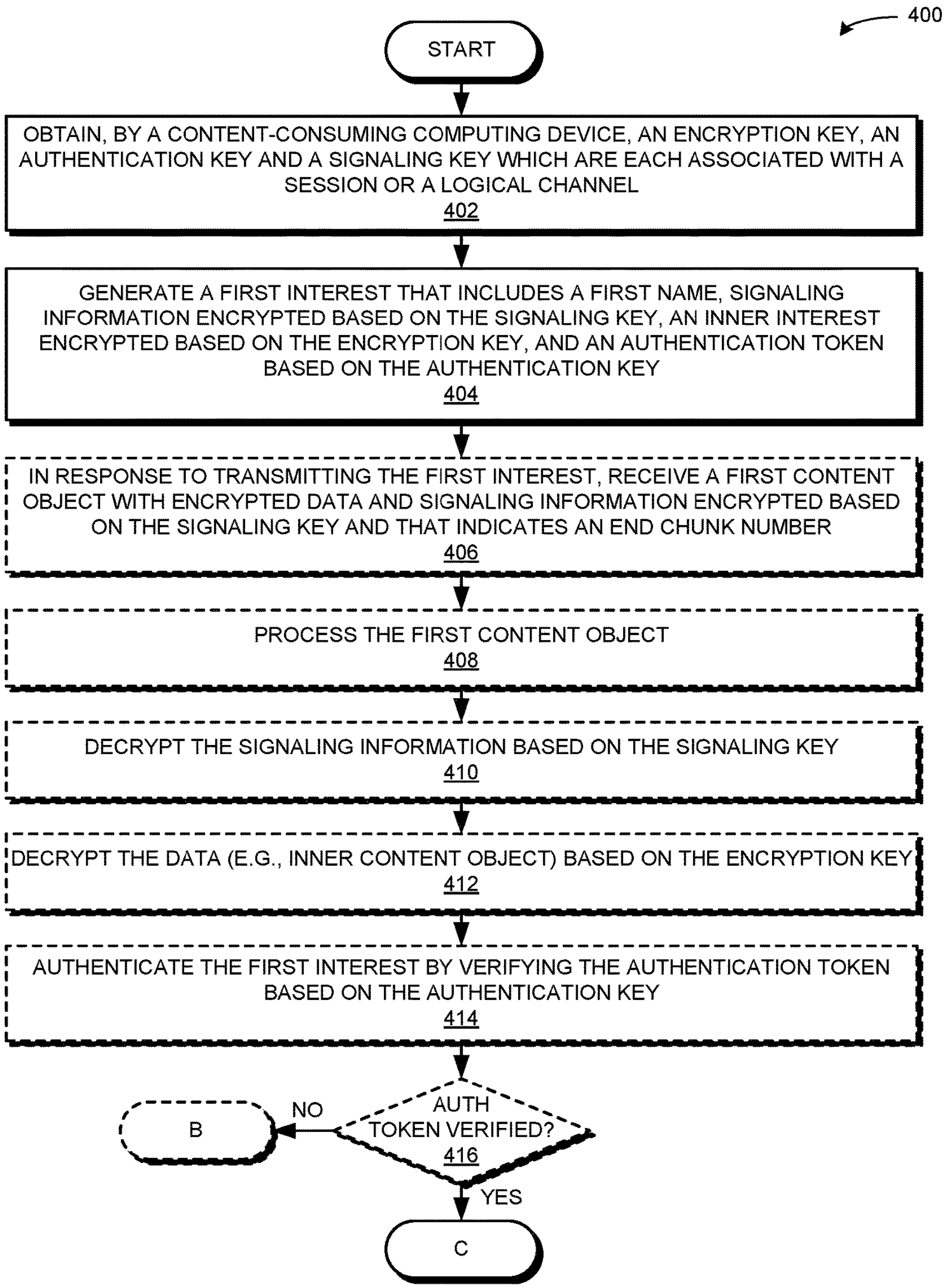
FIG. 4A presents a flow chart illustrating a method by a content-consuming computing device for facilitating a secure encryption proxy in a content centric network, in accordance with an embodiment of the present invention.

FIG. 4A presents a flow chart 400 illustrating a method by a content-consuming computing device for facilitating a secure encryption proxy in a content centric network, in accordance with an embodiment of the present invention. During operation, the system obtains, by the content-consuming computing device, an encryption key $K_E$, an authentication key $K_A$, and a signaling key $K_S$, which are each associated with a session or a logical channel (operation 402). Exemplary key exchange protocols are described above. The system generates a first interest that includes a first name, signaling information encrypted based on the signaling key, an inner interest encrypted based on the encryption key, and an authentication token based on the authentication key (operation 404). The inner interest can include a name for a manifest that represents a collection of data.

In response to transmitting the first interest, the system receives a first content object with signaling information encrypted based on the signaling key and that indicates an end chunk number (operation 406). The system processes the first content object (operation 408). The system decrypts the signaling information based on the signaling key (operation 410). The system decrypts the data (e.g., the inner content object) based on the encryption key (operation 412). The system authenticates the first interest by verifying the authentication token based on the authentication key (operation 414). If the authentication token is not successfully verified (decision 416), the operation continues as described at Label B of FIG. 3C. If the authentication token is successfully verified (decision 416), the operation continues as depicted as Label C of FIG. 4B. Note that operations 406-416 are depicted with dashed lines because they do not need to occur in order for the operations depicted at Label C to occur.

Figure 4B:
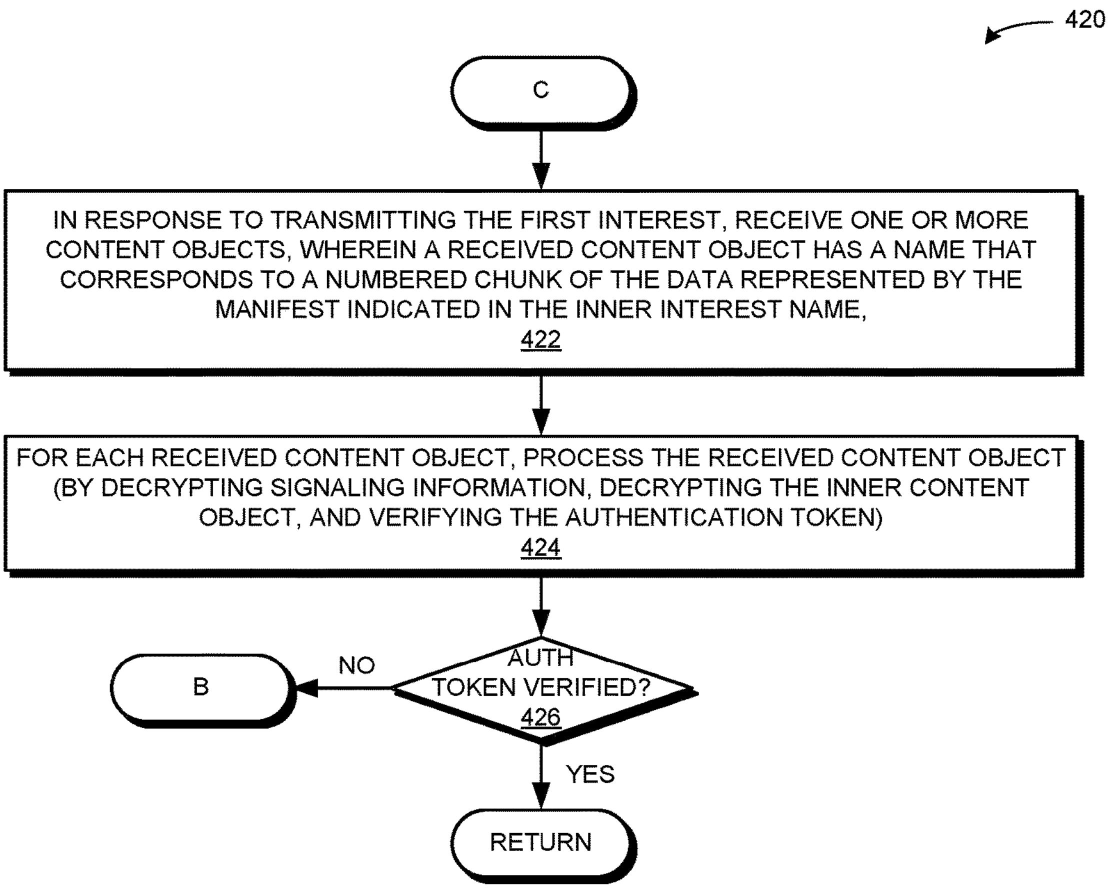
FIG. 4B presents a flow chart illustrating a method by a content-consuming computing device for facilitating a secure encryption proxy in a content centric network, in accordance with an embodiment of the present invention.

FIG. 4B presents a flow chart 420 illustrating a method by a content-consuming computing device for facilitating a secure encryption proxy in a content centric network, in accordance with an embodiment of the present invention. During operation, in response to transmitting the first interest, the system receives one or more content objects, wherein a received content object has a name that corresponds to a numbered chunk of the data represented by the manifest indicated in the inner interest name (operation 422). For each received content object, the system processes the received content object (by decrypting signaling information, decrypting the inner content object, and verifying the authentication token) (operation 424). The received content object includes an authentication token based on the authentication key. This allows the content-consuming computing device to perform authentication by verifying the authentication (not shown), and to send an error message as shown at Label B. In addition, the received content object can include encrypted signaling information and encrypted data (e.g., an inner content object). If the authentication token is not successfully verified (decision 426), the operation continues as described at Label B of FIG. 3C. If the authentication token is successfully verified (decision 426), the operation returns.

Replica Device Facilitates a Secure Encryption Proxy

Figure 5A:
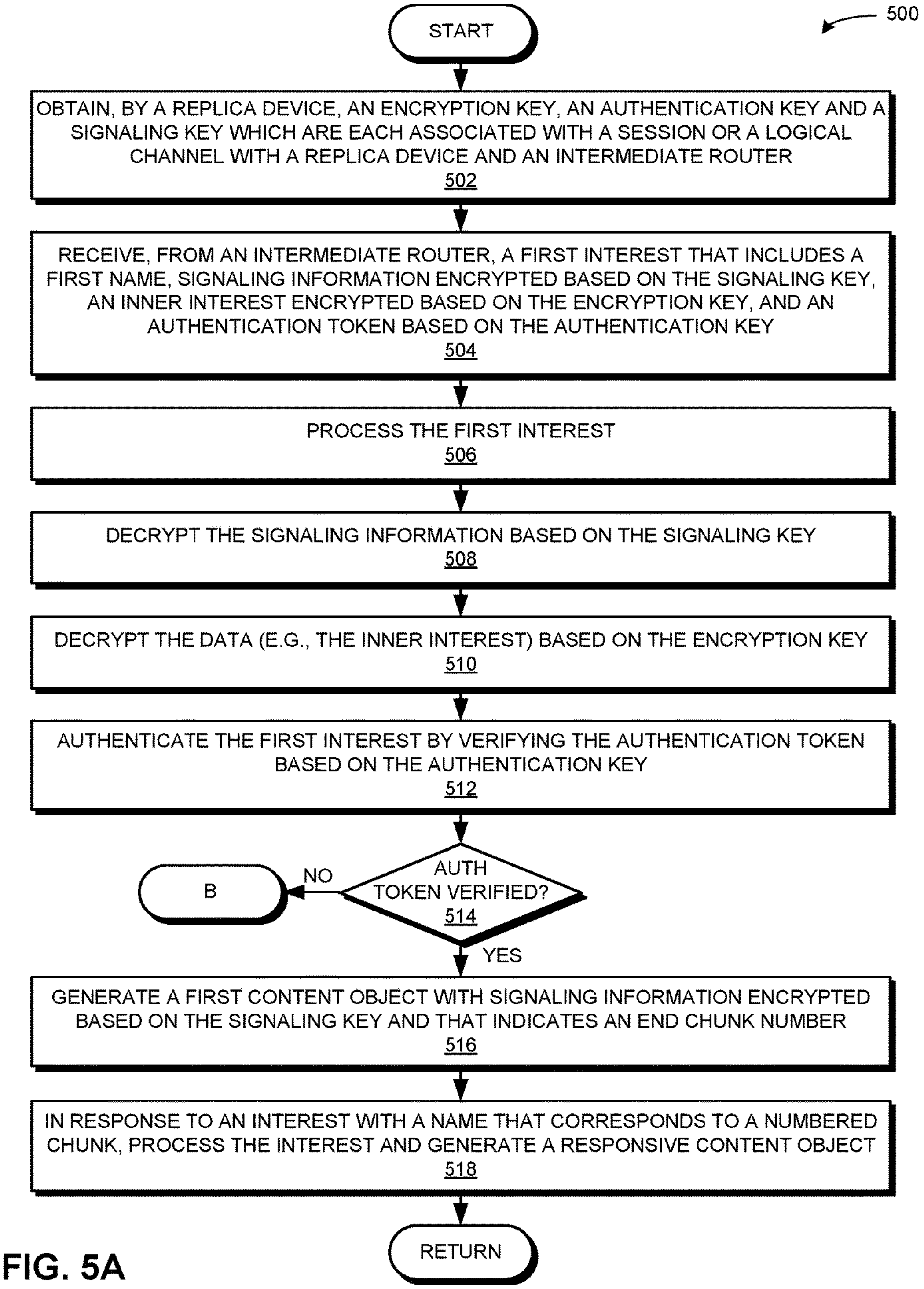
FIG. 5A presents a flow chart illustrating a method by a replica device for facilitating a secure encryption proxy in a content centric network, in accordance with an embodiment of the present invention.

FIG. 5A presents a flow chart 500 illustrating a method by a replica device for facilitating a secure encryption proxy in a content centric network, in accordance with an embodiment of the present invention. During operation, the system obtains, by a replica device, an encryption key $K_E$, an authentication key $K_A$, and a signaling key $K_S$, which are each associated with a session or a logical channel (operation 502). The system receives, from an intermediate router, a first interest that includes a first name, signaling information encrypted based on the signaling key, an inner interest encrypted based on the encryption key, and an authentication token based on the authentication key (operation 504).

The system processes the first interest (operation 506). The system decrypts the signaling information based on the signaling key (operation 508). The system decrypts the data (e.g., the inner interest) based on the encryption key (operation 510). The system authenticates the first interest by verifying the authentication token based on the authentication key (operation 512). If the authentication token is not successfully verified (decision 514), the operation continues as described at Label B of FIG. 3C. If the authentication token is successfully verified (decision 514), the system generates a first content object with signaling information encrypted based on the signaling key and that indicates an end chunk number (operation 516). In response to an interest with a name that corresponds to a numbered chunk, the system processes the interest and generates a responsive content object (operation 518). The responsive content object includes encrypted signaling information based on $K_S$, encrypted data based on $K_E$, and an authentication token based on $K_A$.

Exemplary Computer System

Figure 6:
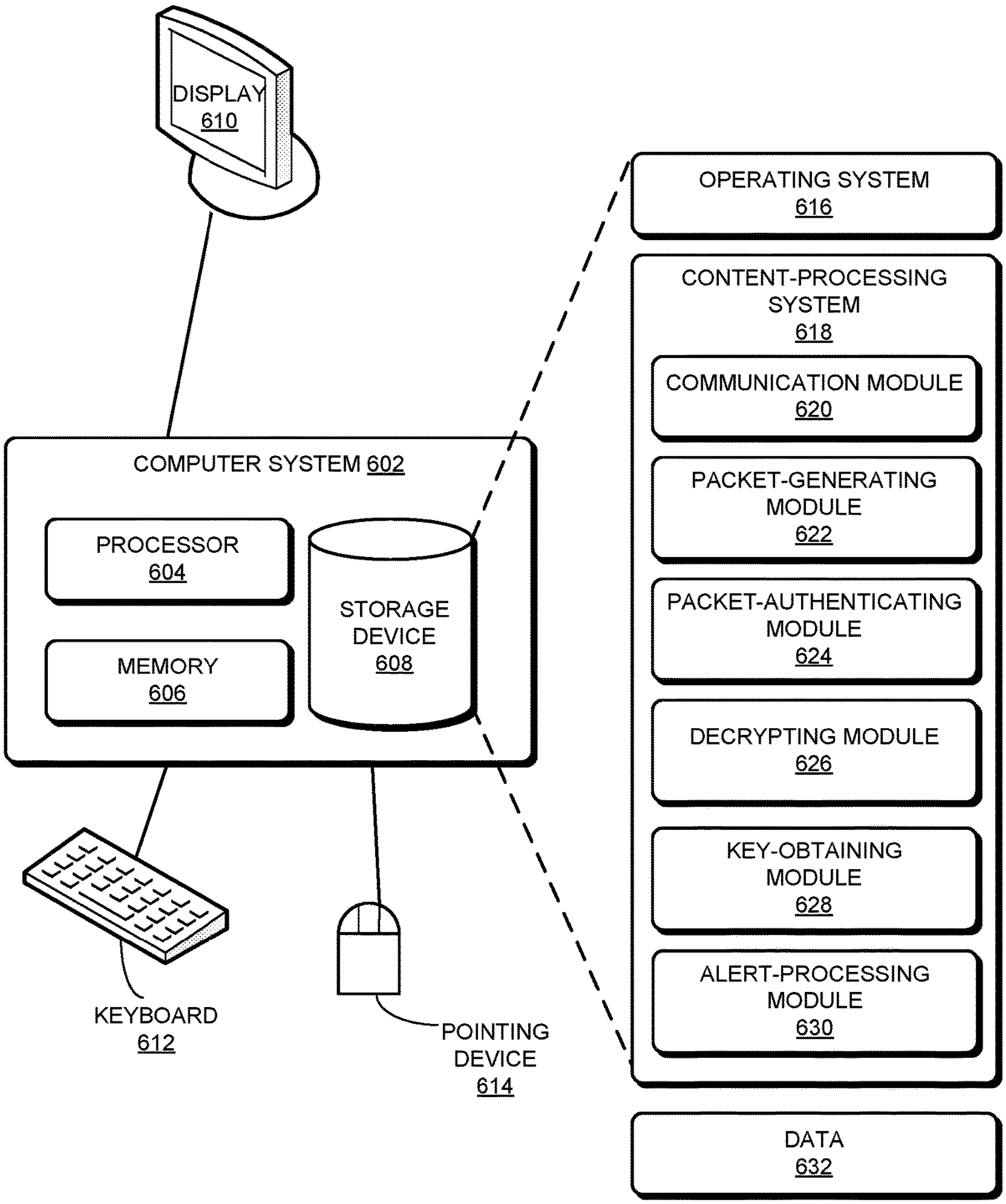
FIG. 6 illustrates an exemplary computer system which facilitates a secure encryption proxy in a content centric network, in accordance with an embodiment of the present invention.

FIG. 6 illustrates an exemplary computer system which facilitates a secure encryption proxy in a content centric network, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 632.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, such as a content centric network (communication module 620). A data packet can include an interest packet or a content object packet with a name which is an HSVLI that includes contiguous name components ordered from a most general level to a most specific level.

Furthermore, content-processing system 618 can include instructions for receiving, by an intermediate router from a content-consuming computing device, a first interest that includes a first name, signaling information encrypted based on a signaling key, and an inner interest encrypted based on an encryption key, wherein the inner interest includes a name for a manifest that represents a collection of data (communication module 620). Content-processing system 618 can include instructions for generating one or more interests for the data represented by the manifest (packet-generating module 622). Content-processing system 618 can also include instructions for transmitting to the content-consuming computing device a content object received in response to a generated interest (communication module 620).

Content-processing system 618 can additionally include instructions for authenticating the first interest by verifying an authentication token based on the authentication key and associated data (packet-authenticating module 624). Content-processing system 618 can include instructions for decrypting the signaling information included in the first interest based on the signaling key (decrypting module 626). Content-processing system 618 can also include instructions for, in response to transmitting the first interest to a replica device, receiving a first content object with signaling information encrypted based on the signaling key and that indicates an end chunk number (communication module 620), wherein generating the one or more interests further involves generating a number of interests equal to the end chunk number (packet-generating module 622). Content-processing system 618 can include instructions for, in response to transmitting a generated interest to a replica device, receiving a responsive content object with a name that corresponds to a numbered chunk of the data represented by the manifest (communication module 620).

Content-processing system 618 can further include instructions for, in response to receiving one or more interests from the content-consuming computing device, forwarding the received interests, wherein a received interest indicates a name for a branch of the manifest (communication module 620), and transmitting to the content-consuming computing device a content object received in response to a forwarded interest (communication module 620). Content-processing system 618 can also include instructions for receiving a second interest that includes the first name, signaling information encrypted based on the signaling key and that indicates the manifest name, data encrypted based on the encryption key, and an authentication token based on the authentication key (communication module 620). Content-processing system 618 can include instructions for authenticating the second interest by verifying the authentication token based on the authentication key (packet-authenticating module 624). Content-processing system 618 can include instructions for obtaining the signaling key and the authentication key based on a key exchange protocol (key-obtaining module 628). Content-processing system 618 can further include instructions for updating an interest received during a second round of communication in the key exchange protocol based on the content centric network by adding a key share of the intermediate router to the interest (key-obtaining module 628) and transmitting the updated interest to a replica device (communication module 620). Content-processing system 618 can include instructions for receiving or generating an alert message (alert-processing module 630).

Content-processing system 618 can include instructions for generating, by a content-consuming computing device, a first interest that includes a first name, signaling information encrypted based on a signaling key, and an inner interest encrypted based on an encryption key, wherein the inner interest includes a name for a manifest that represents a collection of data (packet-generating module 622). Content-processing system 618 can include instructions for. in response to transmitting the first interest to an intermediate router, receiving one or more content objects (communication module 620). Content-processing system 618 can further include instructions for authenticating a received content object by verifying the authentication token based on the authentication key and the associated data (packet-authenticating module 624). Content-processing system 618 can include instructions for decrypting the signaling information included in the received content object based on the signaling key, and for decrypting encrypted data or the inner interest that is included in the received content object based on the encryption key (decrypting module 626). Content-processing system 618 can include instructions for generating one or more interests, wherein a name for a generated interest indicates a name for a branch of the manifest (packet-generating module 622), and receiving a content object in response to a generated interest (communication module 620).

Content-processing system 618 can also include instructions for generating a second interest that includes the first name, signaling information encrypted based on the signaling key and that indicates the manifest name, data encrypted based on the encryption key, and an authentication token based on the authentication key (packet-generating module 620). Content-processing system 618 can include instructions for, in response to transmitting the second interest to the intermediate router, receiving one or more transport content objects, wherein a received transport content object includes signaling information that indicates a request for a leaf of the manifest, and data corresponding to the requested manifest leaf (communication module 620). Content-processing system 618 can include instructions for obtaining the encryption key, the signaling key, and the authentication key based on a key exchange protocol (key-obtaining module 628). Content-processing system 618 can include instructions for receiving, by the content-consuming computing device, the responsive content object that includes the key share of the replica device and the key share of the intermediate router (communication module 620).

Content-processing system 618 can additionally include instructions for receiving, by a replica device, a first interest that includes a first name, signaling information encrypted based on a signaling key, an inner interest encrypted based on an encryption key, and an authentication token based on an authentication key, wherein the inner interest includes a name for a manifest that represents a collection of data (communication module 620). Content-processing system 618 can include instructions for authenticating the first interest by verifying the authentication token based on the authentication key (packet-authenticating module 624). Content-processing system 618 can include instructions for generating a first content object that includes signaling information encrypted based on the signaling key and that indicates an end chunk number that corresponds to a number of chunks comprising the data represented by the manifest (packet-generating module 622). Content-processing system 618 can include instructions for, in response to receiving a subsequent interest with a name that corresponds to a numbered chunk of the data represented by the manifest, generating a subsequent content object with data that corresponds to the numbered chunk (packet-generating module 622).

Content-processing system 618 can include instructions for receiving a second interest that includes the first name, signaling information encrypted based on the signaling key and that indicates the manifest name, data encrypted based on the encryption key, and an authentication token based on the authentication key (communication module 620). Content-processing system 618 can include instructions for authenticating the second interest by verifying the authentication token based on the authentication key (packet-authenticating module 624).

Data 632 can include any data that is required as input or that is generated as output by the methods and/or processes described in this disclosure. Specifically, data 632 can store at least: an interest; an inner or encapsulated interest; a content object; an inner or encapsulated content object; a name; a name that is an HSVLI; signaling information; data; encrypted signaling information; encrypted data; an authentication key; a signaling key; an encryption key; a public private key pair or a data certificate; an authentication token; a manifest name; a manifest branch; a manifest leaf; a collection of data represented by the manifest; data associated with encrypted data and an interest; an end chunk number; a chunk number; a chunk; a key exchange protocol; a key exchange protocol based on a CCN; a key exchange protocol based on a dynamic proxy discovery; a key share; a routable name prefix; a session identifier; a transaction identifier; an alert message; a close message; an error message; a rekey message; and a keepalive message The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:

obtaining, at a router between a content consuming device and a content storage device, a first interest corresponding to a first content object, the first interest comprising a first name identifying the content storage device, signaling information, an authentication token, and an inner interest identifying an actual content object stored at the content storage device, wherein the inner interest is encrypted with an encryption key shared between the 1content storage device and the content consuming device and not shared with the router;

authenticating the first interest by verifying the authentication token using an authentication key shared with the content consuming device;

providing the first interest to the content storage device;

obtaining the first content object from the content storage device, wherein the first content object includes at least a portion of the actual content object encrypted with the encryption key; and providing the first content object to the content consuming device.

2. The method of claim 1, wherein the router communicates with the content consuming device over an air interface to obtain the first interest and provide the first content object, and wherein the router communicates with the content storage device over a wired link to provide the first interest and obtain the first content object.

3. The method of claim 1, further comprising decrypting the signaling information based on a signaling key shared with the content consuming device.

4. The method of claim 1, further comprising:

from the first content object, determining a number of remaining chunks in the actual content object identified by the inner interest;

generating one or more subsequent interests equal to the number of remaining chunks in the actual content object, wherein each subsequent interest includes a name identifying a numbered chunk of the actual content object; and providing the one or more subsequent interests to the content storage device.

5. The method of claim 4, further comprising obtaining one or more subsequent content objects corresponding to the one or more subsequent interests, wherein each subsequent content object corresponds to the numbered chunk of the actual content object corresponding to one of the subsequent interests.

6. The method of claim 1, further comprising obtaining the authentication key via a key exchange with the content consuming device.

7. The method of claim 1, further comprising:

obtaining the authentication key via a key exchange based on a dynamic proxy discovery;

updating the first interest during the key exchange by adding a key share of the router to the first interest; and providing the updated first interest to the content storage device, wherein the first content object includes the key share of the router and a key share of the content storage device.

8. An apparatus comprising:

at least one network interface configured to communicate with computing devices; and a hardware memory; and a processor configured to:

obtain from a content consuming device, via the network interface, a first interest corresponding to a first content object, the first interest comprising a first name identifying a content storage device, signaling information, an authentication token, and an inner interest identifying an actual content object stored at the content storage device, wherein the inner interest is encrypted with an encryption key shared between the content storage device and the content consuming device and not shared with the apparatus;

authenticate the first interest by verifying the authentication token using an authentication key shared with the content consuming device;

cause the network interface to provide the first interest to the content storage device;

obtain the first content object from the content storage device via the network interface, wherein the first content object includes at least a portion of the actual content object encrypted with the encryption key; and cause the network interface to provide the first content object to the content consuming device.

9. The apparatus of claim 8, wherein the network interface includes an air interface to communicate with the content consuming device to obtain the first interest and provide the first content object, and wherein the network interface includes a wired interface to communicate with the content storage device over a wired link to provide the first interest and obtain the first content object.

10. The apparatus of claim 8, wherein the processor is further configured to decrypt the signaling information based on a signaling key shared with the content consuming device.

11. The apparatus of claim 8, wherein the processor is further configured to:

from the first content object, determine a number of remaining chunks in the actual content object identified by the inner interest;

generate one or more subsequent interests equal to the number of remaining chunks in the actual content object, wherein each subsequent interest includes a name identifying a numbered chunk of the actual content object; and cause the network interface to provide the one or more subsequent interests to the content storage device.

12. The apparatus of claim 11, wherein the processor is further configured to obtain one or more subsequent content objects corresponding to the one or more subsequent interests, wherein each subsequent content object corresponds to the numbered chunk of the actual content object corresponding to one of the subsequent interests.

13. The apparatus of claim 8, wherein the processor is further configured to obtain the authentication key via a key exchange with the content consuming device.

14. The apparatus of claim 8, wherein the processor is further configured to:

obtain the authentication key via a key exchange based on a dynamic proxy discovery;

update the first interest during the key exchange by adding a key share of the apparatus to the first interest; and cause the network interface to provide the updated first interest to the content storage device, wherein the first content object includes the key share of the apparatus and a key share of the content storage device.

15. One or more non-transitory computer readable storage media encoded with instructions that, when executed by a processor in a router between a content consuming device and a content storage device, cause the processor to:

obtain from the content consuming device a first interest corresponding to a first content object, the first interest comprising a first name identifying the content storage device, signaling information, an authentication token, and an inner interest identifying an actual content object stored at the content storage device, wherein the inner interest is encrypted with an encryption key shared between the content storage device and the content consuming device and not shared with the router;

authenticate the first interest by verifying the authentication token using an authentication key shared with the content consuming device;

provide the first interest to the content storage device;

obtain the first content object from the content storage device, wherein the first content object includes at least a portion of the actual content object encrypted with the encryption key; and provide the first content object to the content consuming device.

16. The non-transitory computer readable storage media of claim 15, further comprising instructions that cause the processor to communicate with the content consuming device over an air interface to obtain the first interest and provide the first content object, and cause the processor to communicate with the content storage device over a wired link to provide the first interest and obtain the first content object.

17. The non-transitory computer readable storage media of claim 15, further comprising instructions that cause the processor to decrypt the signaling information based on a signaling key shared with the content consuming device.

18. The non-transitory computer readable storage media of claim 15, further comprising instructions that cause the processor to:

from the first content object, determine a number of remaining chunks in the actual content object identified by the inner interest;

generate one or more subsequent interests equal to the number of remaining chunks in the actual content object, wherein each subsequent interest includes a name identifying a numbered chunk of the actual content object;

provide the one or more subsequent interests to the content storage device; and obtain one or more subsequent content objects corresponding to the one or more subsequent interests, wherein each subsequent content object corresponds to the numbered chunk of the actual content object corresponding to one of the subsequent interests.

19. The non-transitory computer readable storage media of claim 15, further comprising instructions that cause the processor to obtain the authentication key via a key exchange with the content consuming device.

20. The non-transitory computer readable storage media of claim 15, further comprising instructions that cause the processor to:

obtain the authentication key via a key exchange based on a dynamic proxy discovery;

update the first interest during the key exchange by adding a key share of the router to the first interest; and provide the updated first interest to the content storage device, wherein the first content object includes the key share of the router and a key share of the content storage device.

* * * * *